(12) United States Patent
Schaefer

(10) Patent No.: US 11,852,493 B1
(45) Date of Patent: Dec. 26, 2023

(54) SYSTEM AND METHOD FOR SENSING WALKED POSITION

(71) Applicant: Philip Raymond Schaefer, Weaverville, NC (US)

(72) Inventor: Philip Raymond Schaefer, Weaverville, NC (US)

(73) Assignee: Vortant Technologies, LLC, Weaverville, NC (US)

( * ) Notice: Subject to any disclaimer, the term of this patent is extended or adjusted under 35 U.S.C. 154(b) by 365 days.

(21) Appl. No.: 17/348,256

(22) Filed: Jun. 15, 2021

Related U.S. Application Data

(63) Continuation of application No. 16/123,028, filed on Sep. 6, 2018, now Pat. No. 11,047,693, which is a continuation of application No. 15/260,483, filed on Sep. 9, 2016, now Pat. No. 10,113,877.

(60) Provisional application No. 62/283,783, filed on Sep. 11, 2015.

(51) Int. Cl.
| | | |
|---|---|---|
| G06F 3/01 | (2006.01) | |
| G01C 21/34 | (2006.01) | |
| G06F 3/16 | (2006.01) | |
| G01C 21/36 | (2006.01) | |

(52) U.S. Cl.
CPC ..... *G01C 21/3415* (2013.01); *G01C 21/3476* (2013.01); *G01C 21/3629* (2013.01); *G06F 3/011* (2013.01); *G06F 3/012* (2013.01); *G06F 3/016* (2013.01); *G06F 3/16* (2013.01); *G06F 3/013* (2013.01)

(58) Field of Classification Search
CPC ............ G01C 21/3415; G01C 21/3476; G01C 21/3629; G06F 3/011; G06F 3/012; G06F 3/016; G06F 3/16; G06F 3/013

USPC ......................................................... 701/417
See application file for complete search history.

(56) References Cited

U.S. PATENT DOCUMENTS

| | | | | | |
|---|---|---|---|---|---|
| 4,371,945 | A | * | 2/1983 | Karr ..................... | G01C 22/006 482/901 |
| 5,117,444 | A | * | 5/1992 | Sutton .................. | G01C 22/006 702/160 |
| 5,307,137 | A | * | 4/1994 | Jones ........................ | A61F 9/08 356/4.01 |
| 6,025,797 | A | * | 2/2000 | Kawai ................... | G01S 7/4026 342/72 |
| 6,145,389 | A | * | 11/2000 | Ebeling ................ | G01C 22/006 73/865.4 |
| 6,452,544 | B1 | * | 9/2002 | Hakala ............... | G01C 21/3635 342/357.31 |
| 6,522,266 | B1 | * | 2/2003 | Soehren .................. | G01S 5/017 600/595 |
| 6,549,845 | B2 | * | 4/2003 | Eakle, Jr. ............. | G01C 22/006 600/595 |
| 6,594,617 | B2 | * | 7/2003 | Scherzinger ......... | G01C 21/188 700/207 |

(Continued)

*Primary Examiner* — Richard A Goldman

(57) ABSTRACT

A system provides feedback to a user to guide the user to point a part of the body at a target of interest. An angle sensor senses the angle in which the part of the user's body is pointing, such as the head or the hand. The system computes the angle to a target and compares to the angle in which the part of the user's body is pointing and the feedback indicates to the user how to point more closely to the direction of the target. Additional sensors allow the system to update the angle to the target as the position of the user changes. A walking sensor is disclosed to accurately measure the position of the user.

20 Claims, 15 Drawing Sheets

(56) References Cited

U.S. PATENT DOCUMENTS

| | | | | |
|---|---|---|---|---|
| 7,596,450 B2* | 9/2009 | Hong | G01C 21/3688 | 340/996 |
| 7,647,196 B2* | 1/2010 | Kahn | A63B 69/0028 | 702/149 |
| 7,648,236 B1* | 1/2010 | Dobson | G02C 11/06 | 351/158 |
| 7,715,979 B2* | 5/2010 | Dix | A01B 69/008 | 701/519 |
| 7,806,767 B2* | 10/2010 | Kitao | A63F 13/10 | 463/31 |
| 7,810,750 B2* | 10/2010 | Abreu | G02C 5/143 | 351/159.75 |
| 7,811,203 B2* | 10/2010 | Unuma | G01C 22/006 | 482/8 |
| 8,055,469 B2* | 11/2011 | Kulach | A63B 24/0062 | 73/865.4 |
| 8,657,886 B2* | 2/2014 | Clausen | A61F 2/70 | 623/47 |
| 8,702,811 B2* | 4/2014 | Ragnarsdottir | A61F 2/76 | 623/47 |
| 8,788,197 B2* | 7/2014 | Fink | G02C 11/10 | 701/436 |
| 8,873,333 B2* | 10/2014 | Keers | G01V 1/28 | 702/14 |
| 9,230,501 B1* | 1/2016 | Starner | G06F 3/147 | |
| 9,317,113 B1* | 4/2016 | Karakotsios | G06V 40/18 | |
| 9,625,720 B2* | 4/2017 | Nohara | G02B 27/0172 | |
| 9,975,483 B1* | 5/2018 | Ramaswamy | B60Q 11/00 | |
| 10,012,506 B1* | 7/2018 | Monahan | G01C 21/20 | |
| 10,295,556 B1* | 5/2019 | Paczkowski | G01N 35/00871 | |
| 11,288,873 B1* | 3/2022 | Eble | G06F 3/011 | |
| 2004/0016870 A1* | 1/2004 | Pawlicki | B60W 30/18 | 315/77 |
| 2007/0248238 A1* | 10/2007 | Abreu | G02C 11/10 | 381/381 |
| 2007/0265777 A1* | 11/2007 | Munakata | G01S 13/931 | 701/469 |
| 2008/0051969 A1* | 2/2008 | Demaya | G05B 13/024 | 701/79 |
| 2008/0144854 A1* | 6/2008 | Abreu | G02C 11/10 | 381/74 |
| 2008/0204306 A1* | 8/2008 | Shirakawa | G01S 13/589 | 342/118 |
| 2009/0052288 A1* | 2/2009 | Eno | G01S 7/4814 | |
| 2010/0256909 A1* | 10/2010 | Duggan | G08G 5/045 | 701/301 |
| 2011/0054834 A1* | 3/2011 | Partridge | G01C 21/1654 | 702/150 |
| 2011/0244881 A1* | 10/2011 | Bando | G01S 19/46 | 455/456.1 |
| 2012/0009553 A1* | 1/2012 | Ben-Tal | A63B 71/0622 | 434/254 |
| 2013/0004028 A1* | 1/2013 | Jones | G06V 10/507 | 382/118 |
| 2013/0030684 A1* | 1/2013 | Wirola | G01S 19/43 | 701/300 |
| 2013/0090881 A1* | 4/2013 | Janardhanan | G06F 1/163 | 702/104 |
| 2013/0096819 A1* | 4/2013 | Tarnok | G01C 21/3844 | 701/538 |
| 2013/0187786 A1* | 7/2013 | Dadlani Mahtani | A63B 71/0622 | 340/691.8 |
| 2013/0222235 A1* | 8/2013 | Abdollahi | G06F 3/013 | 345/156 |
| 2013/0278631 A1* | 10/2013 | Border | G06Q 30/02 | 345/633 |
| 2013/0297460 A1* | 11/2013 | Spivack | G06Q 30/0643 | 705/27.2 |
| 2014/0129178 A1* | 5/2014 | Meduna | G06F 3/017 | 702/189 |
| 2014/0149060 A1* | 5/2014 | Meduna | G06F 1/3206 | 702/94 |
| 2014/0172296 A1* | 6/2014 | Shtukater | G01C 21/3647 | 701/408 |
| 2014/0223647 A1* | 8/2014 | Long | A61F 9/029 | 2/452 |
| 2014/0354450 A1* | 12/2014 | Takahashi | B60Q 9/008 | 340/904 |
| 2015/0025794 A1* | 1/2015 | Long | G01C 21/20 | 2/442 |
| 2015/0042476 A1* | 2/2015 | Holm | G08B 21/088 | 340/573.4 |
| 2015/0054670 A1* | 2/2015 | Wang | A61B 5/0816 | 342/21 |
| 2015/0123919 A1* | 5/2015 | Yamada | G06F 3/017 | 345/173 |
| 2015/0205301 A1* | 7/2015 | Gilmore | G01S 19/13 | 701/11 |
| 2015/0310657 A1* | 10/2015 | Eden | G06Q 30/0273 | 345/441 |
| 2015/0339823 A1* | 11/2015 | Siomina | G01S 5/16 | 348/135 |
| 2016/0080874 A1* | 3/2016 | Fullam | G06F 3/013 | 381/313 |
| 2016/0139411 A1* | 5/2016 | Kang | A61B 3/103 | 359/630 |
| 2016/0258756 A1* | 9/2016 | Ukezono | G06F 13/385 | |
| 2017/0074753 A1* | 3/2017 | Tian | G01M 13/025 | |
| 2017/0098132 A1* | 4/2017 | Yokota | G06T 7/194 | |
| 2017/0102467 A1* | 4/2017 | Nielsen | G01S 19/47 | |
| 2017/0242439 A1* | 8/2017 | Kamizono | G01S 19/53 | |
| 2018/0074600 A1* | 3/2018 | Park | G01S 13/42 | |
| 2018/0100783 A1* | 4/2018 | Stieff | H04N 9/3194 | |
| 2018/0143639 A1* | 5/2018 | Singhal | B60W 40/105 | |
| 2018/0303702 A1* | 10/2018 | Novich | G06V 20/20 | |
| 2019/0008449 A1* | 1/2019 | Samejima | A61B 5/0022 | |
| 2019/0388681 A1* | 12/2019 | Samejima | A61N 1/3603 | |
| 2020/0193149 A1* | 6/2020 | He | G06F 18/22 | |
| 2021/0237683 A1* | 8/2021 | Nakashima | B60R 25/33 | |
| 2021/0347415 A1* | 11/2021 | Nishio | B62D 24/00 | |
| 2022/0026990 A1* | 1/2022 | Mani | G09B 21/007 | |
| 2022/0100979 A1* | 3/2022 | Fernandez-Dorado | G06K 7/10831 | |

* cited by examiner

SYSTEM AND METHOD FOR SENSING WALKED POSITION

CROSS-REFERENCE TO RELATED APPLICATIONS

This patent application claims the benefit of co-pending U.S. application Ser. No. 16/123,028 Filed Sep. 6, 2018, which claims the benefit of U.S. patent application Ser. No. 15/260,483, filed Sep. 9, 2016 (now U.S. Pat. No. 10,113,877), which claims the benefit of U.S. Provisional Application No. 62/283,783, filed Sep. 11, 2015.

GOVERNMENT LICENSE RIGHTS

This invention was made in part with United States government support under one or more SBIR grants from the National Institutes of Health. The United States government may have certain rights in this invention.

FIELD OF INVENTION

This invention relates generally to sensing the orientation a person or a person's head or gaze and sensing the relative position a person has walked and more particularly, to a device that uses measurement data about the person's orientation and walking position to guide the person toward a target of interest.

BACKGROUND OF THE INVENTION

The primary aim of this invention is to provide an aid to enhance the ability of people with tunnel vision, blindness, or other visual disabilities to keep track of their orientation and to orient themselves or their gaze toward targets or paths of interest. The aid is based on an innovative application of head pointing, which not only provides an accessible, hands-free method for input and output, but is also a highly natural and even preferable modality for the type of information relevant to many orientation-related tasks, including searching and scanning, orienting oneself, and recalling directions. The present invention provides an augmentation to the various optical devices, lenses, and prisms currently available, and will also integrate effectively with a variety of indoor and outdoor navigation technologies (GPS, WiFi beacon networks, etc.), which typically have strengths at locating the user and computing optimal routes, but tend to be weaker at providing non-visual guidance on how to proceed. Unlike other high-tech aids, the proposed device requires no cumbersome cameras or head-mounted displays, is inconspicuous, and is of potentially low cost.

Consider the case of a person with extremely limited peripheral vision. The person likely has experienced difficulty in keeping track of where he or she is looking and where he or she is going. Examples of difficulties include: as a student in school, in switching of visual attention between what the teacher had written on the board and the class notebook or, in navigating outdoors, looking at the ground to navigate a curb, then returning the gaze and orientation toward an original goal, such as a crosswalk signal. Such angle-orientation problems extend to large low-vision and blind population.

Problems related to orienting oneself or one's gaze are wide-ranging, and specifics depend on the individual: Tunnel vision is one example. Those with a peripheral visual field of 20 degrees or less are considered legally blind, and at that level of tunnel vision, difficulties are often related to lacking visual cues to direct attention toward objects outside the limited peripheral visual field. Examples include colliding with people approaching from the side, difficulties remembering where objects were placed, etc. At more severely restricted fields, of 5 degrees or less, being able to find things becomes increasingly difficult, even when knowing roughly in what direction they are. Another is an example of not being able to find products—laborious to locate in the first place, on the cluttered shelves of a grocery store after being distracted by a brief conversation. Such individuals spend an inordinate amount of time scanning the visual scene, not to mention encountering obvious safety issues. Among those with low visual acuity or no functional vision, similar problems are encountered. Sometimes people become disoriented inside a store or office, encounter situations of not knowing which direction the front of the store is, or the direction to find the restrooms. There are exciting recreational outcomes for being able to orient one's head accurately as well—for example, the present invention could be used by blind people for bowling.

Review of Existing Solutions to the Problem

This section includes a review of currently-available technology and some approaches in R&D. We conclude that there is a significant unmet need for the functionality available with the present invention.

Compensatory training The traditional approach to addressing the problems caused by tunnel vision and blindness is by learning new techniques, such as through orientation and mobility training, learning to scan more efficiently with the available vision, utilizing other senses, etc. Depending on the individual, varying amounts of training and adjustment may be required. Clinicians train visually-impaired users to organize their living and work spaces and to modify everyday activities to make it easier to find things and navigate the environment. Aids such as cane techniques and guide dogs may be applied.

Optical technologies Devices such as spectacle-mounted mirrors, reverse telescopes, cemented or press-on prisms, and demagnification or illumination devices are most beneficial for users with reasonable visual acuity and wider existing fields of vision. Those with visual fields from 75 to 120 degrees may be helped with prismatic field-expanding glasses. These optical devices can give tunnel-vision sufferers some amount of peripheral vision, enough to know to turn their heads. Such devices, requiring extensive expert fitting and adjusting, further reduce the available undistorted visual field. Designing such devices for less than a 20 degree visual field usually involves many compromises and is reported to be very complex. Optical techniques alone cannot meet many of the user's needs.

Navigation Technologies Accessible electronic travel aids such as GPS units and compasses are available—these solve several problems of orientation and navigation over larger distances, but do not provide accurate angular information needed to move directly through cluttered environments or an ability to point in angle and elevation toward objects in close quarters. GPS systems are unreliable in indoor settings, and although indoor technologies are being developed (WiFi hotspots, Bluetooth beacons), these require significant infrastructure and databases that currently don't exist for the vast majority of buildings.

Some technology for guiding a person's attention to an object of interest have been disclosed. For example, U.S. Patent Application 2015/0310657 by Eden discloses using gaze tracking data and moving a visual display item adjacent to the user's gaze toward the target of interest. However, this approach would be difficult for very limited peripheral vision, since it is visual, and would need to stay within a very precise field of view. It also requires wearing a video display. U.S. Patent Application 2016/0080874 by Fullam discloses processing audio information from a microphone array to emphasize sounds coming from a direction of interest. However, it requires mounting an array of microphones to the user and would not work if no sound is coming from the direction of interest. A technical paper "Using 3D Audio Guidance to Locate Indoor Static Objects" by Samuel Sandberg, et al. (www.umiacs.umd.edu/-elm/projects/3daudio/3daudio.pdf) discloses synthesis of a stereo sound that appears to come from the direction of a target. Recent work in human sound perception has yielded an understanding of how to generate directional sounds much more advanced than by simple binaural phase and amplitude manipulations. Especially relevant are Head Related Transfer Function (HRTF) filters that model the user's ears and surrounding anatomy. The "beacon" sound from the target direction of interest can be fed through HRTF filters to produce realistic stereophonic sounds. Review of literature suggests a head-pointing accuracy on the order of 5 to 10 degrees would be available from this technique, but this may be too large for very limited peripheral fields. Additionally, the technique requires the user to wear stereo headphones, which may be inconvenient or dangerous in some situations, and many people have trouble disambiguating HRTF-generated sounds from the front and rear.

Pedometer technologies. As will be described below, keeping track of the direction of one's gaze is interrelated with keeping track of one's position. For example, if a person is looking a an object on a shelf, then walks a few steps down the aisle, the correct position for looking at that object will have changed. Therefore, a sensor to measure the distance walked would be helpful as a part of the present invention. One approach to measuring distance walked is to use a stride sensor, or other type of walking-distance sensor, which are referred to here as pedometers.

Most commercially-available pedometers in the art simply count steps, then multiply the number of steps by a fixed average stride length. For example, U.S. Pat. No. 5,117,444 to Sutton et al. describes a electromechancal pedulum-based sensor that swings a magnet past a reed switch as the user walks. Methods are disclosed for computing average stride lengths and calculating distance walked. The device mounts on the user's belt, which typically is a convenient location. U.S. Patent Application 2013/0090881A1 discloses an electronic step-counting technique that uses periodicity of an accelerometer waveform to attempt improved detection of how many steps are walked, allowing for unique walking characteristics. However, for people walking very slowly or demonstrating major differences between steps, such sensors do not always provide accurate measurement. For example, when shopping, stride lengths and acceleration characteristics are likely to vary much more than when doing a fitness walk outdoors.

Other prior-art devices use techniques beyond average step length to attempt to improve step length calculations. For example, in U.S. Pat. No. 7,647,196 to Kahn, discloses measuring additional acceleration values on the user's body to characterize the user's gait into various activity categories, and then a specific step length value from that category is used instead of a global step length over all activities. However, there may still be many variations within a category, and if the user's activity is not part of a pre-stored category, incorrect step lengths might be calculated. This device also requires mounting sensors on a plurality of locations on the body, which may be inconvenient.

Devices have been described to more accurately measure walking distance using other types of sensing. U.S. Pat. No. 6,594,617 to Scherzinger describes sensors on each foot that measure relative distance to a backpack-mounted device to compute walked distance. However, the device requires sensors on each foot, and the backpack device, which may not be user friendly for many people in everyday activities. U.S. Pat. No. 4,371,945 to Karr, et al. discloses ultrasonic sensors on each foot, from which the distance between the feet is used to compute total distance traveled, but also requires multiple sensors to be located on or near the feet. Similarly, U.S. Pat. No. 6,549,845 to Eakle, Jr. et al discloses mounting magnets and magnetometers on the feet or footware, and measuring the relative distance from the magnetic fields.

Inventions with a sensor on only one foot have also been disclosed. U.S. Pat. No. 6,145,389 to Ebeling et al discloses a single foot-mounted pedometer that computes distance directly from the accelerometer values. This theoretically provides a good technique for measuring distance, but requires a foot-mounted accelerometer, which is often not practical for some people, and is not compatible with some types of footwear that do not have laces or other areas suitable for mounting of sensors.

Some techniques have been disclosed that use accelerometers that are not on the foot and which measure distances better than step counting. "A Step Length Estimation Model for Position Tracking" by Sun, et. al (International Conference on Localization and GNSS, at Gothenburg, Sweden, June 2015) discloses several methods, including correlation with the magnitude of acceleration (typically, the vertical component thereof), the peak and trough values of the acceleration waveform, and the variance of frequency of the steps taken to estimate step length. However, when taking single steps or very few steps at a time, the variance of walking appears to be ill-defined, thus problematic. Most of the approaches seem to not be able to make significant use of the horizontal acceleration components, although intuitively one would expect much useful information to be available from those axes.

In summary, it is evident that existing optical, navigation, and walking-distance technologies do not solve all of the principal problems addressed by the present invention. However, these technologies are often very useful at solving related problems, and many could gainfully integrated with the present invention.

OBJECTS AND ADVANTAGES OF THE PRESENT INVENTION

Therefore, several objects and advantages of the present advantage are:
 (α) Provide a tool to quickly guide a person's gaze to a direction of interest,
 (β) In particular, guide a person with tunnel vision to be able to see an object of interest,
 (χ) Provide effective audio and haptic guidance to efficiently guide the user's head toward the target,
 (δ) Provide effective audio guidance toward the target even with a single-ear headset,
 (ε) Provide means to lessen the effects of biomechanics, physics, and reaction time in guiding the user's head toward the target,
 (ϕ) Provide a tool to guide a person to navigate toward a target of interest,
 (γ) Update the relative direction of a target of interest as the person moves in the environment, (η) Provide accurate walked-distance measurements with a single, wearable sensor that need not be on the foot,
(ι) Provide guidance in navigating through spaces without pre-existing maps or GPS signals available,
(φ) Provide these functions in a hands-free format, and
(κ) Integrate these functions with smartphones and GPS systems

SUMMARY OF THE INVENTION

One embodiment of the present invention uses a head-worn electronics unit that measures the gaze angle of the user and provides audio or tactile feedback to guide the gaze angle toward a target of interest. The invention includes means to store targets and retrieve them, so that the gaze angle to one or many targets can be obtained in the future.

Another embodiment of the invention includes measuring the user's position as the user moves, and updating the gaze angle output accordingly, Yet another embodiment includes a walking-distance sensor that accurately measures the distance walked, using a convolution technique to compare the accelerations measured during walking to an ideal model of step accelerations.

In yet another embodiment of the invention, the user is guided not only to have a gaze angle toward a target, but to follow a path to reach the target.

Other embodiments of the invention include interfacing to navigation systems such as GPS, and control devices, such as smartphones.

DESCRIPTION OF THE PREFERRED EMBODIMENTS

This specification uses the terms "gaze direction" and "gaze angle" interchangeably with the user's head angle or head orientation. Technically, the gaze angle can be different than the head angle, but for the purposes of the present invention, one may assume that if the head is pointed toward a target of interest, the gaze will naturally be able to also fix on the target of interest. Alternate embodiments of the invention could add the feature of an eye tracking mechanism to measure and make use of a more exact gaze angle, and make equivalent use of the following features of the embodiments described below.

Figure 1:
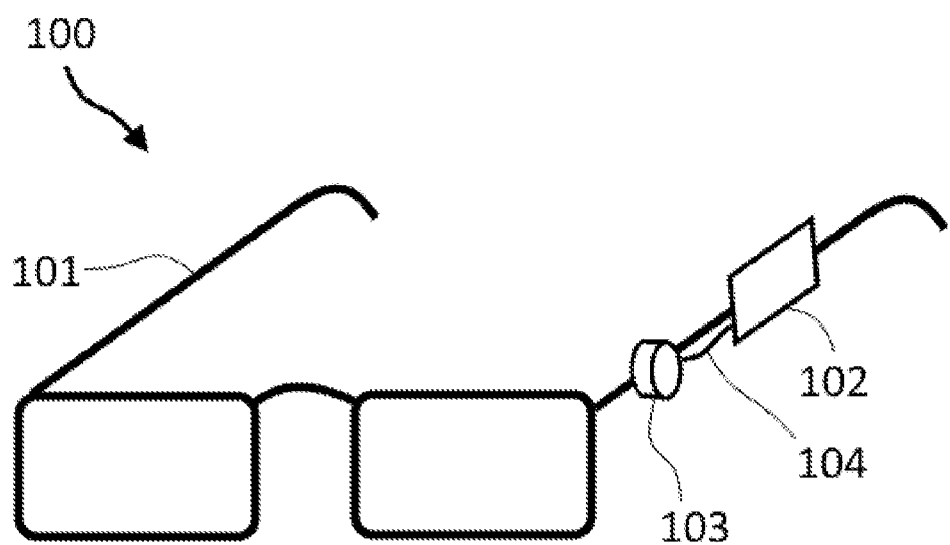
FIG. 1 depicts a preferred embodiment of head-worn eyeglass hardware to monitor a person's direction of gaze and direct that person to direct his or her gaze toward a target of interest.

A preferred embodiment of Head-worn eyeglass hardware 100 to monitor a person's direction of gaze and direct that person to direct his or her gaze toward a target of interest is depicted in FIG. 1. In this embodiment of the present invention, electronic circuitry 102 is mounted on the frame of a pair of eyeglasses 101. As the person moves his or her head, sensors in electronics 102 measure the orientation of the head using techniques described in detail below. Vibration unit 103 is shown in the figure, also mounted on eyeglass frame 101 and connected via wiring 104 to electronics unit 102. In this embodiment of the present invention, haptic feedback is given to the user via vibrations of vibration unit 103, which will be felt by the user. The user moves his or her head in accordance with the haptic feedback, which directs their head toward the target. For example, in a preferred embodiment, the intensity of the vibration gets lower as the user's head gets more in alignment with the target direction, so when the user moves the head to minimize the vibration, the user's gaze angle will be in the target direction.

Figure 2:
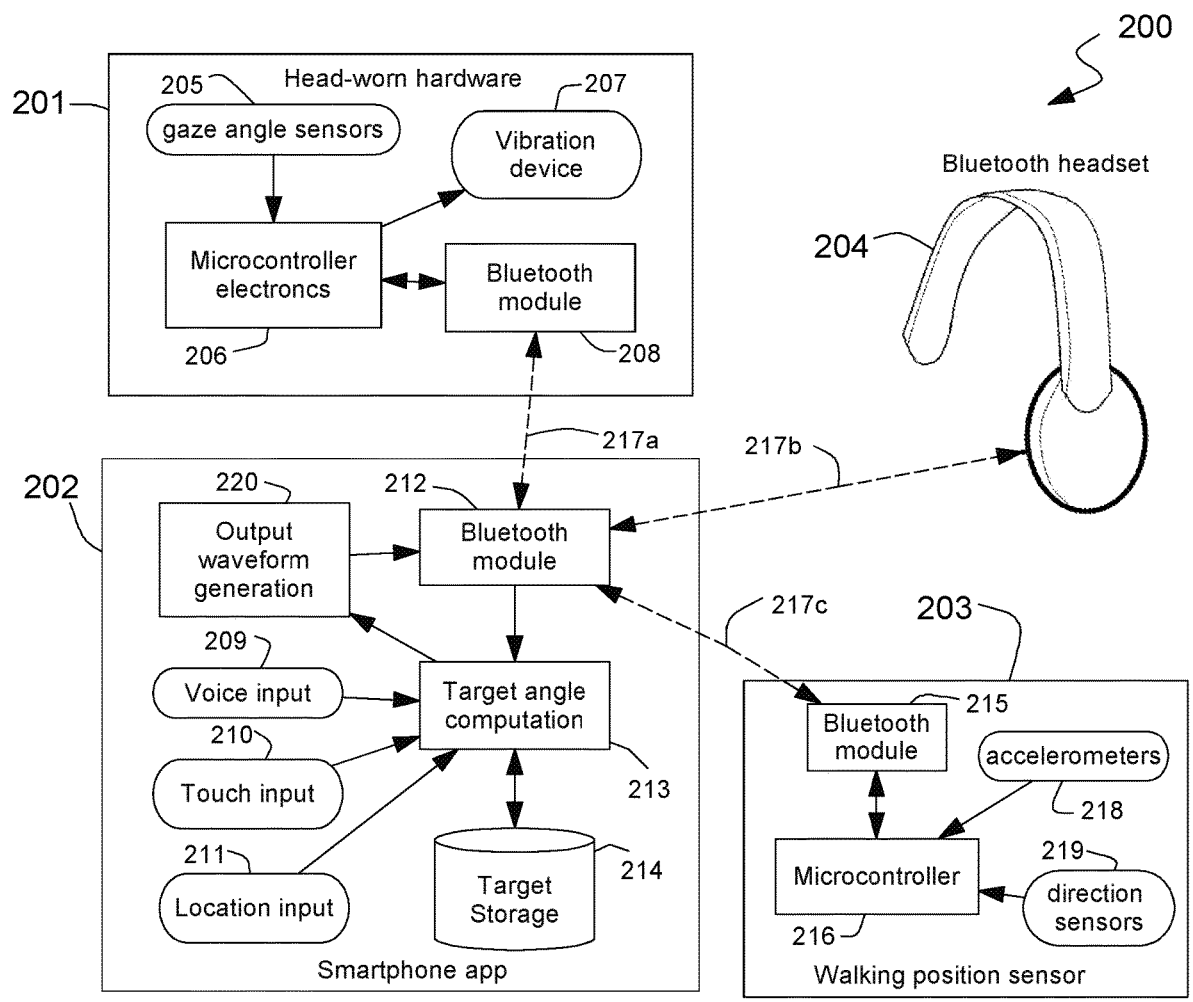
FIG. 2 shows a block diagram of a preferred embodiment of a complete gaze director system to direct the person's gaze toward a target or target direction in space.

FIG. 2 shows a block diagram of a preferred embodiment of a complete gaze director system 200 to direct a person's gaze toward a target or target direction in space. Head-worn hardware 201 could resemble Head-worn eyeglass hardware 100, or could be a similar hardware package mounted to an audio headset, cap, or other object attached to a user's head. Head-worn hardware 201 contains one or more gaze angle sensors 205. Example gaze angle (or, as used interchangeably here, head angle) sensors include accelerometers, magnetic field ("compass") sensors, and angular rate (also known as "gyro") sensors. For example, the HMC5843 three-axis geomagnetic field sensor and the LIS344 three axis accelerometer devices are examples of such devices. Microcontroller electronics 206 inputs the sensor values from gaze angle sensors 205 and performs computations to convert these inputs into useful measurements, such as yaw, nod, and tilt angles indicating the orientation of the user's head. Vibration device 207 could be a separately-mounted vibration unit such as vibration device 103, or could be mounted onto the same circuit board that contains microelectronics 206 or gaze angle sensors 205.

In the embodiment of the present invention shown in FIG. 2, Head-worn hardware 201 uses a wireless link, such as provided by Bluetooth module 208, to be in communication with smartphone app 202 that inputs the sensor readings from head-worn hardware 201, processes the signals, and determines what feedback needs to be given to the user.

Wireless link 217a between head-worn hardware 201 and smartphone app 202 allows smartphone app 202 to receive the data about the user's current head (gaze) pointing angle and send the feedback about which direction the head should be turned to point at the target. In addition to the haptic feedback described above in Head-worn eyeglass hardware 100, audio feedback could alternately or in conjunction be given to the user via a head-worn or bone-conductive audio device such as a headset. This could be done by optionally adding an audio output module to head-worn hardware 201. A preferred embodiment of the present invention uses wireless link 217b to transmit audio feedback information to Bluetooth headset 204, or other wireless headset. Alternately, a standard wired headset or headphone could be used. The audio feedback given to the user preferably is a tone, for example, that gets lower in frequency as the user's head is pointed more closely toward the target of interest.

As an alternative to providing vibration feedback from a head-worn device such as head-worn eyeglass hardware 100 or audio feedback via Bluetooth headset 204, vibration or audio feedback could alternately be provided by a control unit, such as the smartphone that hosts smartphone app 202.

The preferred embodiment of the present invention uses Bluetooth wireless technology as the links 217a, 217b and 217c. Alternately, other types of wireless links could be used, or the invention could have a wired communications link between the circuit board of the wearable electronics and the processing device, which in turn could be worn by the user or held by a nearby person, or if the application is for use in a small area such as at a desk, it could be situated near the user.

In the preferred embodiment of the present invention, Target angle computation module 213 in smartphone app 202 calculates the difference between the user's current gaze angle and the desired gaze angle to a target of interest, so that the above audio or haptic techniques have the means to guide the user toward the desired gaze angle. The desired gaze angle is computed from information about the target position provided by Target Storage 214, which stores information about the position of one or more targets. In its simplest form, Target Storage 214 is a collection of one or more data elements that indicate the position of targets purely as angular positions, that is, angles in space, for example, a yaw and elevation angle the user recently was pointing to and which was stored into Target Storage 214 when looking at a product on a grocery shelf. If a target position is stored only as angles, the user will have to remember the observation location at which the stored angle indicates the target position. Target Storage 214 preferably also holds location information about targets, such as the point in space of the observation point (point at which the angle to the target was recorded), the point at which the target (if the target is an object rather than a direction) is located in space, and/or the distance between the observation point and the target along the direction of the target angular position. Targets stored in one of these ways could include directions to an office, the user's home, or directions to points of interest provided from shared databases. Target Storage 214 is preferably implemented as a database, to allow efficient storage and retrieval. The user can interact with the smartphone app 202 in several ways. Voice input 209 utilizes any one of several available smartphone speech recognition modules to translate voice commands for the system. These could include commands to remember the current gaze angle, to guide the user toward a gaze angle, to turn the unit on and off, change the type of feedback, etc. Touch input module 210 uses the smartphone touch screen input to access similar capabilities. Alternately, input from other input devices known in the art, such as keyboards, mice, and other pointing and text-input devices could be used.

When Target angle computation 213 has computed a difference angle to be output to the user, which can also be thought of as an error signal indicating the error between the desired and actual gaze angles, Output waveform generation 220 converts the needed angular-change information into a feedback cueing signal that can be sensed and understood by the user. If voice output is desired, the output preferably is a speech waveform containing words such as "left", "right", "up", and "down". Tone waveforms are generated with a sine wave or any arbitrary waveform, and in the preferred embodiment, are generated as a tone with varying characteristics, for example amplitude, pulse rate, and/or frequency, as a function of the angle by which the head needs to be turned. For vibration waveforms, vibration characteristics, for example amplitudes, pulse rates, and/or vibration frequencies, are specified or directly generated. Preferably, these feedback outputs implement one of the feedback techniques shown below. In the preferred embodiment, the waveform is sent over the Bluetooth module 212. For audio signals, a Bluetooth stereo or mono audio waveform is be encoded and transmitted to Bluetooth headset 204. Alternately, for audio or vibration to be output from head-worn hardware 201, the data can be encoded in digital bytes sent by a serial port or other Bluetooth protocol using techniques known in the art. In the preferred embodiment, Target angle computation 213 continues to update the target angle and Output waveform generation 220 continues to output feedback signals as the user follows the feedback signals toward the target, until the user turns off the feedback or until the error between the target angle and the current gaze or pointing angle is less than a threshold value, for example, 10 degrees, or if the feedback has been given for more than a threshold amount of time. Optionally, the Output waveform generation 220 will generate a special feedback signal indicating success when the user achieves a gaze or pointing angle that meets the threshold criteria, for example, a speech output that says "You are now pointed to the target".

If the user moves about in space, the direction to a target of interest is likely to change, particularly if the target object is located near the user. For example, in a doctor's office, the direction to the front desk will be different from the front door, a seat in the waiting room, or from the nurse's station. Although a simple embodiment of the present invention stores only the gaze angle to a target in Target Storage 214, the preferred embodiment of the invention also stores location information so that Target angle computation module 213 can update the target gaze angle based on the user's location. Location input 211 provides location input to enable these angle-update calculations, which are described in more detail below. Location input 211 preferably provides location information obtained from GPS or an indoor navigation system available on the smartphone.

In a preferred embodiment of the present invention used not only for pointing in a target direction, but also for navigating toward a target location, Target Storage 214 additionally contains series of target points that define one or more paths through space. For example, in addition to a target used to point the user toward the front desk, Target Storage 214 could contain a path to follow from the nurse's station to the front desk, including turns and straight points. Although the representation of paths could utilize any path representation technique known in the art, the preferred embodiment of the present invention uses a series of points in which a straight line is assumed between the points. As the user reaches each point in the path, which is determined in the preferred embodiment by comparing the measured location of the user to the point in the path within a threshold, an output is optionally given to the user and Target angle computation 213 uses the subsequent point in the path as the next target as described above.

In a preferred embodiment of the present invention, Walking position sensor 203 provides additional position updates, for example when very small changes in position occur over a few steps and the target object is within a few meters of the user. The input from Walking position sensor is also particularly useful when GPS signals are not available, such as in many indoor scenarios. Walking position sensor 203 obtains the distance and/or direction the user has walked by processing inputs from one or more accelerometers 218 and direction sensors 219. Microcontroller 216 gathers and formats the data, and in the preferred embodiment, implements calculations to determine walked distance and direction for output through a connection to the rest of the system, in the preferred embodiment, via Bluetooth module 215. Walking position sensor 203 is preferably mounted in a position where distinctive walking accelerations can be measured, such as on or near the waist, the feet, elsewhere on the lower body, or carried in a pouch. Positions on the chest or upper arm could alternately be used. Direction sensors 219 preferably include an angular rate sensor and magnetic field sensor, but could be any direction-sensitive sensors known in the art. The directional sensors used in gaze angle sensors 205 could also be shared with the functions described here, but with likely higher errors. For example, the accelerations due to walking that are measured at the head will be similar, but not identical, to the accelerations measured by accelerometers 218. The directional information measured at the head with gaze angle sensors 205 could be assumed in many cases to average the walking direction over time, and hence used as directional sensors for Walking position sensor 203.

Regardless of the sensor specifics, by measuring the distance and direction walked, a relative position, or sensor data suitable for computing relative position, is provided to smartphone app 202 via wireless link 217c or other communications channel. More details on the algorithms used to compute position from the sensor measurements obtained by Walking position sensor 203 are provided below. In an alternate embodiment of the present invention, other types of pedometers or position sensors could provide position information to smartphone app 202 instead of Walking position sensor 203. Alternately, the processing depicted in Walking position sensor 203 could be hosted in the smartphone app 202 using the smartphone's built-in acceleration and direction sensors.

In the preferred embodiment of the present invention, Target angle computation 213 combines the location information from Location input 211, for example GPS, and the Walking position sensor 203. Location input 211 is utilized whenever available, for example, when GPS signals are present, to keep an updated position on the Earth's surface. As soon as GPS data is lost, the input from Walking position sensor 203 is used to continue to update the user's current position so that a continuity of position estimation is maintained. When GPS or other data is again available from Location input 211, the difference between the new data and the position estimated by sensor 203 is used to warp the path stored in-between, and any marked positions or gaze angles are corrected based on this warping. The simplest warping in the preferred embodiment assumes that the error in position grew linearly over time, so that a linear corrective function is applied over the path between the two endpoints where absolute location input was not available. Likewise, for smaller walking excursions that are smaller than the resolution of Location input 211, the inputs from walking position sensor 203 are used to make small-resolution updates to the latest location, so that small changes in distance will continue to be available in the gaze-angle updating algorithms in Target angle computation 213.

Figure 3:
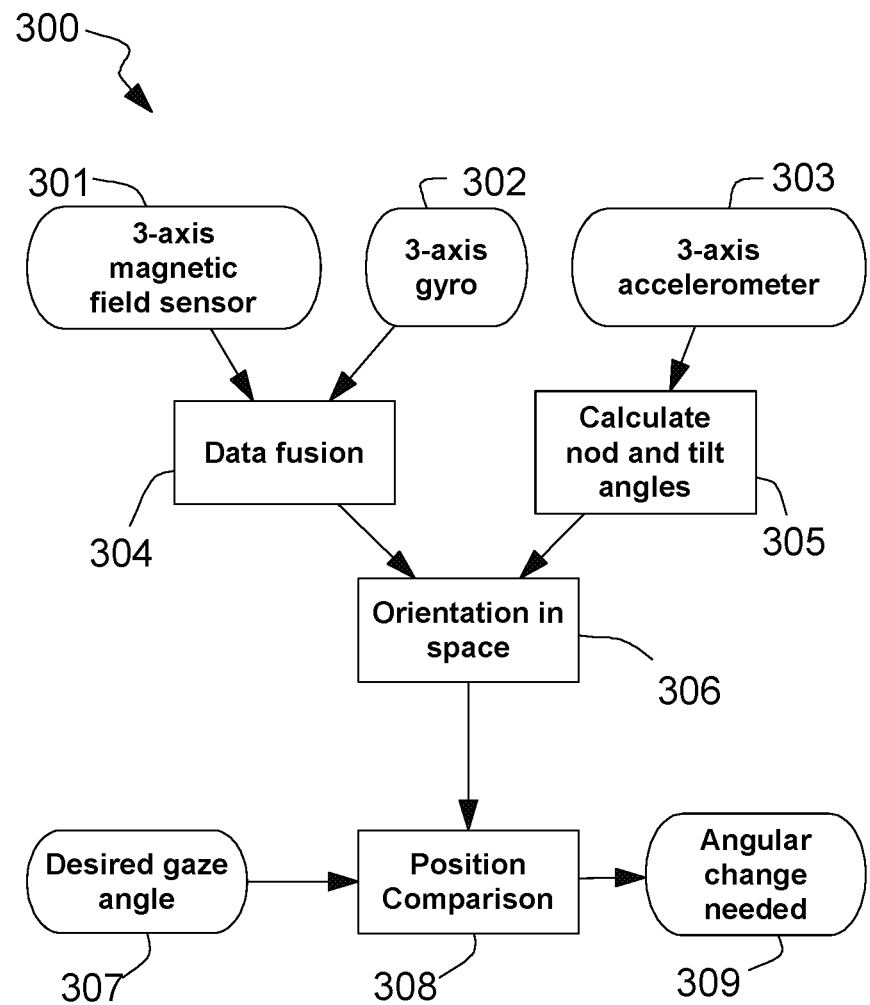
FIG. 3 depicts the preferred embodiment for angular change computation, which calculates the needed change in angle for the user to rotate his/her head to achieve a desired gaze angle.

FIG. 3 depicts the preferred embodiment for Angular change computation 300, which calculates the needed change in angle for the user to rotate his/her head to achieve a gaze angle of a desired direction. Angular change computation is implemented in the preferred embodiment within Target angle computation module 213. In the preferred embodiment, the directional information from magnetic field sensor 301 is combined with the information from gyro 302 to create a yaw angle by Data fusion block 304. The yaw angle from integrating the angular-rate gyro readings from gyro 302 is subject to integration drift. The compass readings from magnetic field sensor 301 are not subject to drift, but are subject to errors from stray magnetic fields, such as from nearby steel structures, so can be locally prone to error. (Although the preferred embodiment depicted in FIG. 3 includes 3-axis sensors, 2-axis or 1-axis devices could alternately be used with slightly less flexibility in alternate embodiments, as will be apparent to those with skill in the art.)

Data fusion 304 processing combines the best of both direction-sensitive sensors, using, for example, a Kalman Filter, as is known in the art. The block Calculate nod and tilt angles 305 uses accelerometer 303 readings to output angles corresponding to the elevation angle with respect to horizontal (nod), and the sideways tilt angle of the head. For many applications, the tilt angle is not needed, and in some, such as finding directions within a building or neighborhood, the nod angle is also not needed, unless the user has to look up or down to identify something, so these blocks may optionally be omitted from an embodiment of the invention. The set of angles defining the direction in which the head is pointing (also termed "gaze angle"), defines Orientation in space 306. Finally, to produce the output Angular change needed 309 that enables feedback to the user about which way to turn the head, Orientation in space 306 output is compared by Position Comparison 308 to Desired gaze angle 307, which, for example in the smartphone app 202, is obtained from Target Storage 214. For example, Position Comparison 308 could independently subtract the Orientation in space 306 yaw and nod angles from the Desired gaze angle 307 yaw and nod angles, providing corresponding Angular change needed 309 yaw and nod angles. Optionally, Position Comparison 308 could ignore differences smaller than a threshold "don't care" distance, or could categorize the distances into ranges of change needed, rather than specific angles in degrees or radians. If the head-motion prediction function described below is being used, the Angular change needed 309 is a function not only of the instantaneous difference between Desired gaze angle 307 and Orientation in space 306, but also a function of the speed at which the user's head is moving and the time delays in the system. In this case, a preferred embodiment of Position Comparison 308 also includes the algorithms described below that take such effects into account.

All of the processing of angular change computation 300 could occur within smartphone app 202, or it could be configured such that all or a portion of the processing occurs within an external device such as Head-worn hardware 201. For example, if all the processing occurs within smartphone app 202, firmware in the Head-worn hardware 201 sends all raw data from the sensors over link 217a, requiring substantial bandwidth. If an embodiment where data fusion 304 is housed in microcontroller 206 of head-worn hardware 201, then only the resultant yaw angle is transmitted over link 217a, potentially reducing bandwidth by a factor of six. As another example, if the processing above Position Comparison 308 is done in Head-worn hardware 201, only the Orientation in Space 306 data would be sent to smartphone app 202 over link 217a. The invention optionally could compress the data sent of link 217a using methods known in the art, to compensate for such issues.

In an alternate embodiment of the present invention, the functions of head-worn hardware 201 are contained within smartphone app 202 instead of being housed separately. Gaze angle sensors 205 could then be called "Pointing angle sensors" instead. This embodiment would be of use for people who did not have tunnel vision, or for uses where precise pointing is not as important as general directions, such as turns to take when navigating a building. In this embodiment, the pointing of the algorithms described herein is done with respect to the smartphone and its sensors, rather than with respect to the user's head. Other embodiments could include a separate hardware unit analogous to head-worn hardware 201, but mounted to the hand other body part of the user or vehicle, such that the gaze angle sensors 205 would be measuring the pointing angle of the hand or other body part. For example, a key fob style case with buttons for storing and recalling gaze angle directions could be used instead of, or in conjunction with smartphone app 202, and could include some or all of the processing described above for head-worn hardware 201 and smartphone app 202.

Other embodiments of the present invention could implement the functionality of smartphone app 202 on a platform other than a smart phone, such as a tablet, a smart watch, a head-worn computing device such as the well-known Google, Inc. Glass, or other computing device. In yet another embodiment of the present invention, a custom unit with controls similar to those described for smartphone app 202 is provided, with or without the inclusion of smartphone app 202 on another platform.

Head-Worn Hardware and Mechanical Details

Figure 4:
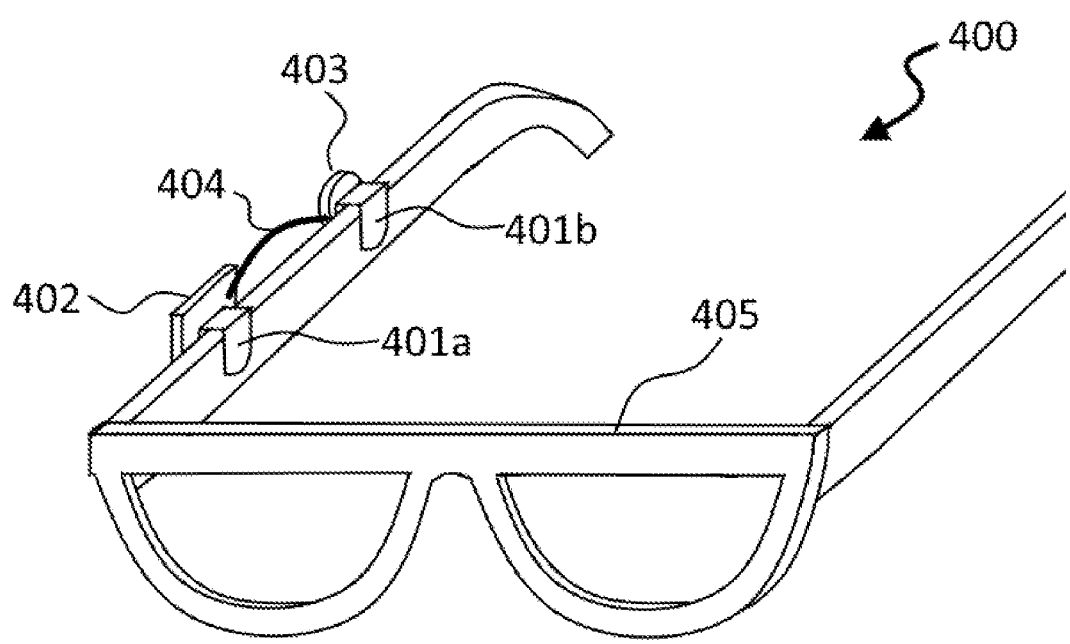
FIG. 4 shows a preferred embodiment of clip-mounted eyeglass electronics.

A wide range of user characteristics also leads to a wide variety of mounting needs. For example, totally blind people often do not wear eyeglasses, but those with tunnel vision often have eyeglasses with specialized optical devices, such as prisms. People with retinitis pigmentosa (RP) often have high sensitivity to outdoor light and wear protective shades to provide optimal visibility. To accommodate this wide range of mounting requirements, the preferred embodiment does not permanently mount the head-worn hardware 201 to a particular style of eyeglass frame, but instead is affixed temporarily via a clip, spring, or other attachment, or permanently via glue, or manufactured as part of eyeglasses such as eyeglasses 101. FIG. 4 shows a preferred embodiment of Clip-mounted eyeglass electronics 400. Clip 401a clip holds circuit board 402 onto eyeglass frame 405, Circuit board 402 includes the main sensor and circuit board of the head-worn hardware of the present invention, for example, gaze angle sensors 205, microelectronics 206 and Bluetooth module 208 of FIG. 2. Clip 401b holds a vibration unit 403, for example, Vibration device 207 of head-worn hardware 201, which is connected to circuit board 402 with cable 404. Preferably, an additional clip similar to clip 401b is also attached to the other arm of glasses 405. This will allow haptic feedback on either side of the user's head; for example, vibration on the left could mean to turn the head toward the left, and vice versa. Adapters are optionally manufactured for the present invention to allow circuit board 402 and vibration unit 403 to be mounted onto a cap, a visor, helmet, or to be clipped onto the UV overglasses often worn by the RP population. Other mounting techniques, apparent to those with skill in the art, could hold the head-wearable parts of the system to a wired or wireless headset, cap, headband, hair band or other head-worn contrivance. In the preferred embodiment of the invention, circuit board 402 and vibration unit 403 are protected by an enclosure such as an injection-molded plastic box. Optionally, Vibration unit 403 could be within the same enclosure as circuit board 402 or mounted on circuit board 402.

Although a different plastic case may be required for a headset-mounted unit vs. the glasses, the preferred embodiment includes a circuit board that fits on either. A small rechargeable lithium-ion watch battery serves as a preferred power source, and a subminiature USB connector is preferably included on circuit board 402 for recharging and firmware updates.

Since the vibration unit(s) are preferably co-located on the wearable electronics, the vibration waveform is preferably generated by firmware in the processor on the wearable electronics. The vibration output is preferably from one or two small, 8 mm circular vibrators attached to the user's glasses. If haptic feedback has been specified in the user preferences, the firmware preferably generates vibration PWM outputs to drive the vibrators, based on vibration specifications received from target angle computation processes, such as the Output waveform generation 220. Other linear vibrators, voice-coil vibrators, etc. could also be used in the present invention.

In an alternate embodiment of the present invention, the head-worn hardware, for example clip-mounted eyeglass electronics 400, contains all of the processing to measure gaze angle and determine vibration feedback. In this embodiment, functions analogous to Output waveform generation 220 are included on circuit board 402. For example, when the user is looking in a certain direction, a "store" button or tap detector on circuit board 402 stores the direction, and when a "retrieve" button or tap detector on circuit board 402 is pressed, the functions shown in FIG. 3 are implemented in a microcontroller on circuit board 402 to generate vibration waveforms, such as PWM pulses, to direct the user's head toward the remembered direction according to one of the vibration encodings described below. Audio output could also be optionally included in an embodiment of this alternative. In this embodiment, a Bluetooth module or headphone jack on Circuit board 402 transmits voice and tone to the headset.

The above embodiments are only example configurations of the processing for achieving the functionality of providing gaze angle guidance to the user with the present invention. Many other "divisions of labor" of the modules in FIGS. 2, 3, and 4 may be implemented within the scope of the present invention, transmitting information between different blocks over wired or wireless links. Another embodiment of the invention could be in an existing head-worn device, such as the Google Glass or other system that may have all the sensors and actuators, as well as ability to run apps, to support an implementation of the present invention.

Feedback Approach

Several audio, vibration, and visual feedback techniques that may be utilized in embodiments of the present invention are described here. Each feedback technique is used for the purpose of indicating which direction or directions the user needs to turn his/her head to be pointing in the desired target direction.

Stereo Audio Feedback

One audio feedback embodiment uses the relative angle of the target direction compared to the user's current gaze direction, then a stereo sound is synthesized that appears to come from the direction of the desired target, using techniques such as the Head-related Transfer Function (HRTF) that are known in the art. The accuracy of this approach is limited by how acutely the user can identify the apparent angle of the sound.

Audio Tone Feedback

Another embodiment of audio feedback, providing arbitrary pointing precision that is limited only by the sensor characteristics, is to generate an audio tone that is a function of the angular error between the current head position and the desired target position, for example, a higher tone for a larger error. The user reaches the target position by moving his or her head in the direction of the lowest possible tone. By providing a nonlinear mapping between tone and error angle, arbitrary precision can be achieved. An additional advantage of this approach is that it need not be stereophonic—a single audio channel can suffice. A more sophisticated, and potentially more efficient embodiment generates a stereo signal, where the relative amplitudes and/or phase of the tone to the two ears provides additional audio cues as to the needed direction of head motion. Alternate embodiments of this feedback technique include increasing or decreasing pulse width as the target is approached, or increasing instead of decreasing tone toward the target. An alternate embodiment also adjusts the volume to increase or decrease as the user gets closer to the target.

Vibration Feedback

Haptic embodiments of the present invention use vibration. As hearing loss is sometimes associated with Retinitis Pigmentosa, a vibration feedback embodiment may be preferable. A preferred embodiment of a vibration feedback technique encodes the angular error information in a temporal vibration pattern—for example, with changes in the pulse width of a pulse-width modulated (PWM) vibration, such as shortening the duty cycle as the target orientation is reached. The preferred embodiment augments the vibration pulses by also modulating the vibration amplitude, or by providing a differential amplitude signal between vibration actuators on the right and left side of the head, for example, by using two vibration device 403 units on the two sides of eyeglass frame 405 of FIG. 4.

Speech Feedback

An alternative audio feedback embodiment generates a voice signal that says "up", "down", "left", "right", "success", or similar words. The preferred embodiment combines the voice signals with the audio tone feedback described above. In the preferred embodiment, for this small vocabulary, pre-recorded waveforms of the voice signals are played back. The preferred embodiment also plays the words back in apparent stereo, varying the relative strength of each channel according to the angular error position, using techniques known in the art.

Visual Feedback

An alternative embodiment uses Visual feedback, for example, LEDs on the periphery that light up to indicate which direction to move toward or away. Alternately, a blinking LED could mean "move toward" and a solid LED could mean "move away". Or different colors could indicate "toward" and "away from". The speed of the blinking or the intensity of the light or both could be used to indicate how far away the user is from the goal direction.

Band of Tone or Band of Vibration

Instead of having tone or vibration in the entire range of pointing, an alternate embodiment of the present invention uses a virtual "band" to encode one of the two angles of yaw or nod. In a preferred embodiment, a horizontal band is defined within a small range of the nod angle of the target, for example, 10 degrees. No tone or vibration feedback is provided until the user reaches the correct nod angle, and then the feedback is activated. The use then moves his/her head right and left (yaw) within the band to reach the target, according to any of the above feedback techniques that are active in the band. Similarly, an alternate embodiment uses a vertical band at the correct yaw angle, in which feedback is provided until the user is at the correct nod angle.

If the present invention is being used for navigation or going large distances, the up/down aspect of the gaze angle might not be relevant. In this case, the up/down information is preferably omitted from the encoding of gaze angles, and everything works essentially as described above, using only yaw angle. In the preferred embodiment, settings indicate whether a pointing in 2D space or 3D space is currently needed.

Head Motion Prediction

With the above feedback techniques that use only the instantaneous gaze direction and the desired gaze direction, a likely problem with some users will be overshooting the desired target, having to move back and forth past the target several times before settling on the target gaze angle. This is because of several time delays. In the preferred embodiment of the present invention, the gaze-directing sensing and feedback system is viewed as a closed-loop system with the human user in the loop. Delays in the feedback loop include not only the electronic delays in the circuitry and wireless links described above, but also delays in human perception, cognition, and biomechanics. Accordingly, the preferred embodiment includes a motion-prediction filter as part of the feedback system. Instead of simply generating a tone based only on the current position of the head, the motion-prediction filter takes into account how fast the head is currently moving, as well as the processes involved in changing one's head motion. For example, if the user's head is moving to the right quickly, and is almost upon the target, the effect of this algorithm is to start giving feedback to turn leftward a bit before reaching the target angle. The user will thus begin to decelerate and effectively stops upon reaching the target position and angle, rather than overshooting the target.

Various techniques known in the art for predicting future values of a time series could be used for this calculation. For example, the most recent two head angles of Orientation in space 306 could be used to create a linear prediction of the next angle. Three or more such angles of orientation could be used with a cubic spline or other nonlinear technique known in the art. Higher-order, such as spline fitting and parabolic or higher polynomial fitting could also be used. Kalman filters would be appropriate. In the preferred embodiment of the present invention, the past N time points are used to create a linear interpolation of the future head position, and the predicted value at a point T in the future is used as the input to Position Comparison 308 of the Angular Change computation 300, where N and T are variables specified for the user of the device. Alternate embodiments of the invention utilize more sophisticated predictive capabilities such as described above, to optimize the time at which the user is predicted to reach the target gaze angle.

Figure 5:
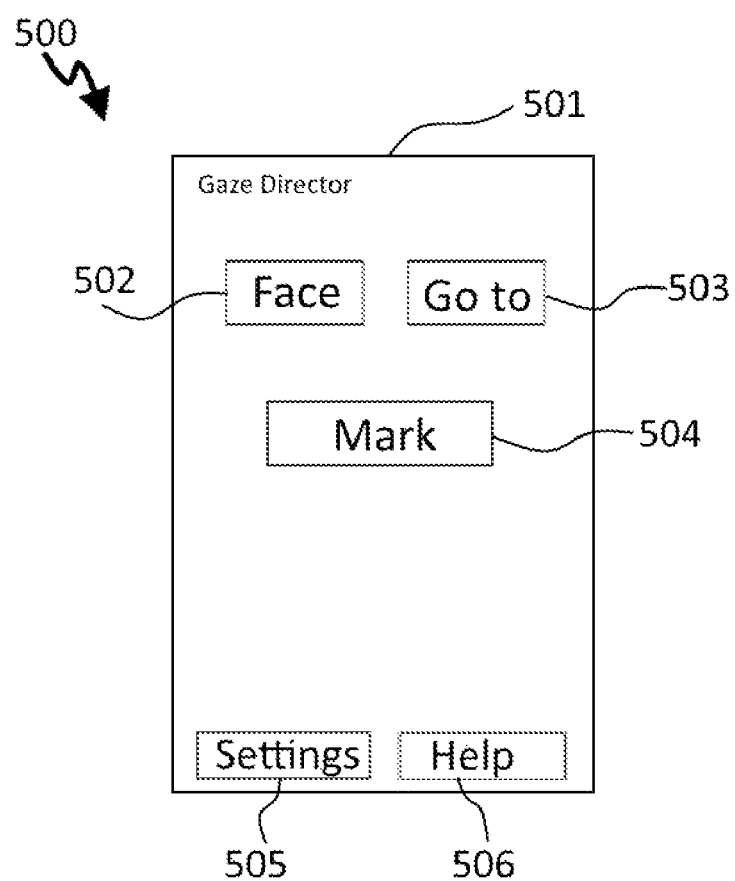
FIG. 5 depicts the preferred embodiment of a user interface for a smartphone app.

User Interface for Storage and Retrieval of Directions:

FIG. 5 depicts the preferred embodiment of a user interface 500 of a gaze director smartphone app, which, for example, could serve as an embodiment of touch input 210 of smartphone app 202. User interface 500 includes a series of interface screens, such as the depicted top-level layout 501. The preferred embodiment includes features to support the following functions:

(α) Mark a gaze direction—invoked by tapping on Mark button 504, which causes the app to record a target point in space via the current direction of gaze, preferably along with the position at which the Marking is taking place, so as to be able to return to that point from the target or elsewhere. The preferred embodiment of the invention also provides an input for the user to input a text or speech label for the target to aid in later recall.

(β) Face—invoked by tapping on Face button 502, which causes the app to orient toward, for example, turn the gaze direction toward, the direction of a target of interest. The preferred embodiment allows the user to scroll through recently-marked targets, access a target by a speech or text label, or to scroll through nearby targets.

(χ) Go to—invoked by tapping on Goto button 503, which causes the app to give feedback to orient toward the target of interest and continue updating the direction as the user proceeds toward the target. The preferred embodiment allows the user to scroll through recently-marked targets, access a target by a speech or text label, or to scroll through nearby targets.

(δ) Settings—invoked by tapping on Settings button 505, which allows specification of audible and haptic feedback (cueing) types, volumes, connection to GPS app, off/standby settings, etc, using commonly-implemented settings interface techniques used in the art.

(ε) Help—invoked by tapping on Help button 506, which provides information to the user about how to use the app, designed using commonly-utilized help-generating techniques in the art.

Additionally, the preferred embodiment of User interface 500 includes additional layouts with the following functions:

(α) Reverse—a screen that appears after tapping on Face button 502 or Go to button 503 that performs a Face or Go to function to where the target in question was Marked from, rather than toward the target itself. This is performed in the preferred embodiment by using the position where the target was marked as the goal in the Target Storage 214, (β) Right,Left,N,S,E,W—orient as specified relative to the current gaze direction or to an absolute compass direction (implemented in the preferred embodiment by adding or subtracting 90 degrees for relative angles, and getting the other directions from the calibrated magnetic field sensor)

(χ) Hints to the user about distances to targets, targets available near the user's location, etc., implemented in the preferred embodiment by examining the Target Storage in comparison with the current location of the user.

Updating the Gaze Angle to the Target as the User Moves

As mentioned above, the preferred embodiment of the present invention includes target angle updating capabilities, such as in Target angle computation 213, because as the user moves, the relative angle to most targets of interest will change. If the exact location of the target and of the user are known, it is straightforward to calculate an angle from the user to the target with basic trigonometric techniques known in the art, and the present invention updates the target angle using such techniques.

Figure 6:
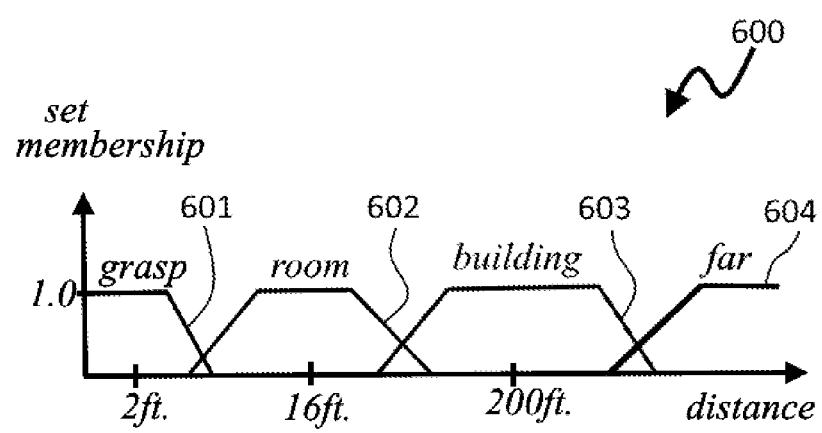
FIG. 6 depicts the preferred embodiment of fuzzy distance sets for input of distances to targets.

However, if the exact location of the target is not known, it is more difficult to maintain an angle to the target. For example, assume that the user wishes to Mark the gaze direction to the front door of a doctor's office while standing at the front desk. The user may know roughly that the door is across a large room, but not know quantitatively how far away it is. Instead of specifying an exact distance to a target when marked, in the preferred embodiment, the user specifies a fuzzy set representing distance. Fuzzy representation in general is a technique known in the art. Using fuzzy set-membership techniques, the user inputs, when recording a gaze direction, one of a set of target distance categories. FIG. 6 depicts a preferred embodiment of fuzzy distance sets, which are: "within grasp" or "grasp" 601, "room-sized" or "room" 602, "building sized" or "building" 603, and "far away" or "far" 604. The fuzzy set membership function 600 indicates the likelihood that a particular distance is part of a particular fuzzy set. For example, at a distance of 2 feet, the fuzzy set membership in the "grasp" fuzzy set 601 is 1.0. Other numbers of fuzzy sets or other distances corresponding to the members, or other schemes for naming and assigning distances to the sets are within the scope of the invention.

The various distance categories may be entered by the user in a variety of ways. In the preferred embodiment, there is one button on the smartphone app 202 corresponding to each fuzzy-distance set. Alternately, a single button could be used to move through the distances, with a visual or voice output describing which choice is currently selected. Alternately, up/down buttons could be used to set the distance category. Vibration could also indicate which choice is currently selected, for example, the number of vibration pulses corresponding to which fuzzy distance set. Alternately, text or speech input could specify the distance category, either by a number or letter, or an actual label of the distance, for example, saying "room sized". For example, when standing at the front desk, when Marking the gaze angle to the front door of the doctor's office, the distance would probably be in either "room" or "building", depending how far the user had walked from the front door.

Figure 7:
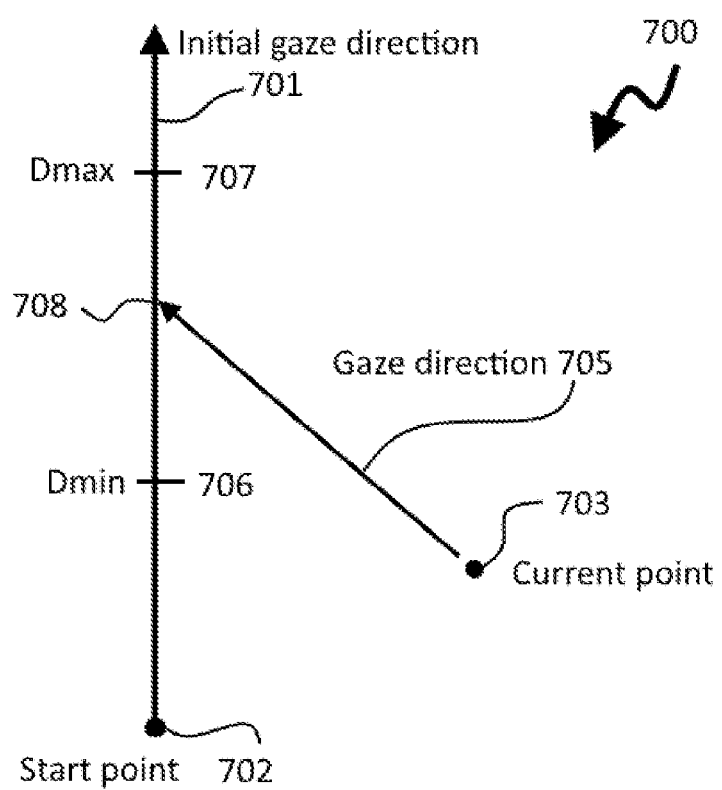
FIG. 7 graphically depicts a gaze-angle updating algorithm used to update gaze angle as the user moves.

FIG. 7 graphically depicts a gaze-angle updating algorithm 700 used by the preferred embodiment of the present invention to update gaze angle as the user moves. Initially, the user is at Start point 702 when initial gaze direction vector 701 toward an object is marked. Along with Initial gaze direction 701, the user specifies the distance to the target as falling between Dmin 706 and Dmax 707, for example, by specifying one of the fuzzy sets shown in FIG. 6. Then, assume the user moves to Current point 703. The purpose of the algorithm is to define a new Gaze direction 705 that best points toward the target.

If the user wishes only to look at the target, but not navigate to it, the preferred embodiment of algorithm 700 is to define Gaze direction 705 to be at the midpoint of the segment 706 to 707, or point 708, assuming the actual target is equally likely to be closer to Start point 702 than point 708 as it is to be farther from point 708 toward point 707. If the goal of the user is to navigate toward the target, the preferred embodiment takes more into consideration. For example, if the user were to walk directly toward point 708, when reaching the initial gaze direction vector 701, it would be equally likely that a right turn or a left turn would be needed to reach the actual target. To reduce this ambiguity, the preferred embodiment defines the gaze direction 705 differently. For example, if the user wishes to be 100% sure of knowing which way the target is, the algorithm defines Gaze direction 705 to be toward whichever of Dmin point 706 or Dmax point 707 is closer to Current point 703, then guides the user toward that point. When reaching the line defined by Initial gaze direction 701, the algorithm directs the user toward the opposite point. If the user wishes to be relatively sure, but accepts a small chance of overshoot, for example, being 90% sure of knowing which way the target is, the algorithm defines Gaze direction 705 to be somewhat closer to the center of the line segment from Dmin 706 to Dmax 707.

Figure 8:
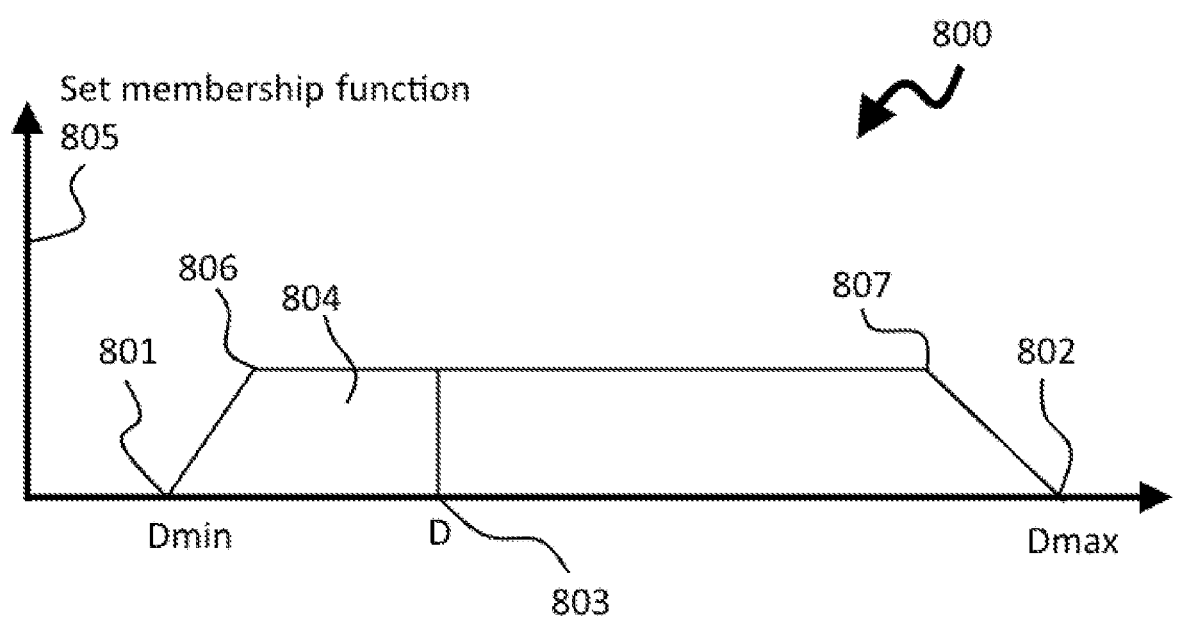
FIG. 8 graphically depicts a likelihood algorithm to find an optimal point to direct the user to, along an initial gaze angle direction.

FIG. 8 graphically depicts a Likelihood algorithm 800 used in the preferred embodiment of the present invention to find an optimal point D 803 along an initial gaze angle direction such as gaze direction vector 701 of FIG. 7. The selection of D 803 for example, would be used in the Updating algorithm 700 to select point 708 to define a good Gaze direction 705. In FIG. 8, set membership function 805 indicates the likelihood of each point between Dmin 801 and Dmax 802 being in the fuzzy distance set specified for the target. If set membership function 805 is treated as a kind of probability density function, the optimal point D 803 is chosen such that the area 804 under the curve less than point D 803 meets a goal criterion. For example, if the goal is to point at the most likely target position, point D 803 is chosen in the preferred embodiment so that area 804 constitutes half the total area under set membership function 805. If the goal is to direct the user to a point such that the target is X % likely to be to the right of the point D 803, point D 803 is chosen such that area 804 constitutes (100-X) percent of the total area under set membership function 805. The scope of the present invention includes any technique for choosing a point D 803 on the basis of set membership function 805. For example, the weight of the area under the sloping parts of the membership function 805, such as the area between point Dmin 801 and point 806, or between point 807 and point Dmax 802 can be weighted differently, for example, weighting those areas to have a total of 20% the total weight of the area between point 806 and point 807. The scale between Dmin 801 and Dmax 802 can also be non-linear, for example, a logarithmic distance scale, such that the areas will be differently weighted, as will be apparent to those with skill in the art. Similarly, the shape of Set membership function 805 can be other than a series of straight line segments, so as to differently weight different parts of the area under the curve between Dmin 801 and Dmax 802.

A 3-D version of Updating Algorithm 700 may be used in an alternate embodiment of the present invention if the target is of unknown vertical as well as horizontal distance, and the application of similar mathematical principles will be apparent to those with skill in the art. The details of the implementation of Updating Algorithm 700 and Likelihood algorithm 800 based on the trigonometry and calculus depicted in FIGS. 7 and 8 will be apparent to those of skill in the art.

Integration with GPS and Other Navigation Systems

Commercially-available navigation systems for blind and visually-impaired people or for the general public have the potential to be integrated with the present invention. In a preferred embodiment of such integration, the present invention serves to help point the user's head toward the destination or to turns when the destination is nearby. Typically, available navigation systems such as are available on iOS and Android smartphones provide only very rough relative directional information, for example, "The destination is on your left", "The destination is 100 feet ahead". However, much more precise information is typically available internally, within the apps, and the user could benefit from this detailed information—the apps just don't have an effective way to communicate range and bearing accurately to the user in an intuitive way that directly guides the user to be able to find and see the destination or other point in the route being navigated. The present invention provides a tool to accomplish giving precise, yet intuitive directions to improve the effectiveness of the navigation system.

Figure 9:
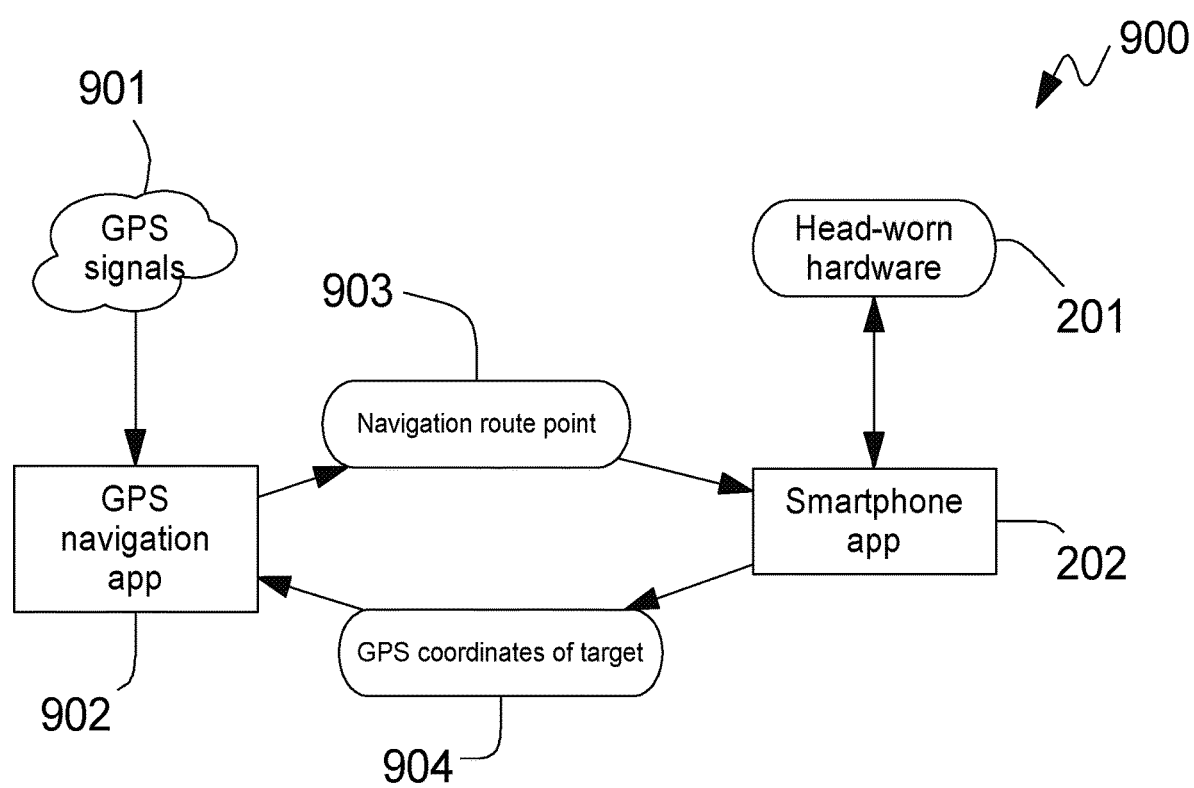
FIG. 9 depicts a software integration that connects the present invention to a GPS navigation app.

FIG. 9 depicts a preferred embodiment of a software integration 900 that connects the present invention to a GPS navigation app 902 such as is available on a smartphone, in order to communicate detailed gaze-direction related information to smartphone app 202. GPS navigation app 902 uses GPS signals 901 to guide a user toward a destination of interest along a navigation route that is computed within GPS navigation app 902 or elsewhere and provided to GPS navigation app 902. Additionally, GPS navigation app 902 communicates data including Navigation route point 903 to the present invention's Smartphone app 202. Navigation route point 903 can indicate the destination point, or points that are part of the route, such as turns, or short distances along the path after a turn. Using basic trigonometric techniques known in the art, Smartphone app 202 includes additional processing to compute the desired gaze angle between the current GPS position and the GPS position of Navigation route point 903. This angle is used by the Target angle computation 213 algorithms described above to compute a difference angle between the desired gaze angle and the user's current gaze angle as reported by Head-worn hardware 201. Using the algorithms described above, the user's gaze is directed toward the GPS navigation route point. For example, assume a driver is driving a car and the GPS navigation system currently says "Your destination is on the left". In a cluttered, busy neighborhood, the driver might not spot the exact destination in time to slow down and make the correct turn, even though the GPS system knows precisely where the destination is. If the present invention is used, it can help the user point his/her head directly at the destination, and update it as the car moves, so that the user can more quickly see it and make the correct turn.

Analogous techniques would be used in an alternate embodiment of the present invention to interface the present invention to a indoor navigation system or other navigation system. It could also be used in conjunction with a video-based system that detects objects in the environment and computes paths or with any other system that computes paths to be followed. Each direction to be taken in the path would be communicated to the present invention as a Navigation route point 903 or a gaze direction.

The GPS or other navigation system optionally includes an interface by which the present invention provides information to the navigation system or invokes functionality of the navigation system. In one embodiment, whenever the user Marks a gaze angle and distance, Smartphone app 202, augmented according to Software integration 900, computes the GPS coordinates of target 904 by adding the vector defined by gaze direction and distance to the current position. Additionally, Smartphone app 202 preferably sends a text or voice label associated with the target to GPS navigation app 902. Then, targets defined in Smartphone app 202 will also be available as future GPS navigation destinations for GPS navigation app 902.

Alternate embodiments of Software integration 900 within the scope of the present invention could transmit different information, such as range and bearing instead of GPS coordinates between GPS navigation app 902 and Smartphone app 202, such that similar overall processing results.

Walking-Distance Sensor Details

Figure 10:
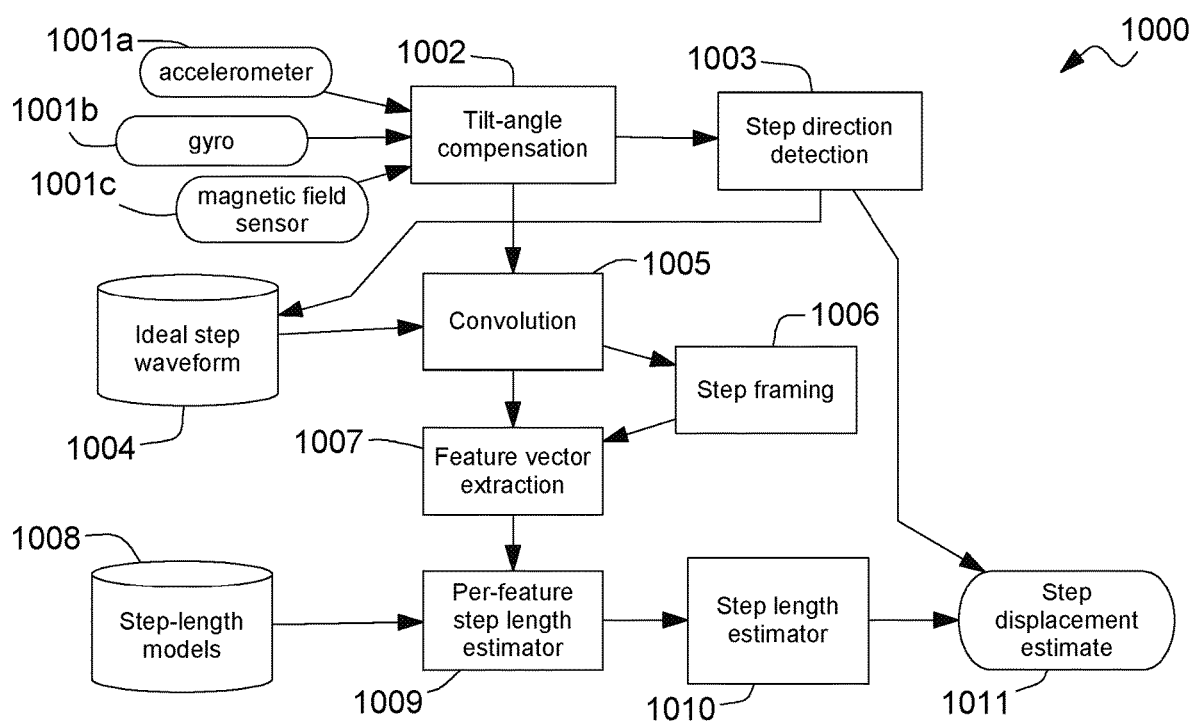
FIG. 10 depicts the details of a walking sensor to measure the position to which a user has walked.

FIG. 10 depicts the details of the preferred embodiment of Walking Sensor 1000, which could serve, for example, as Walking Position sensor 203 in FIG. 2. Walking Sensor 1000 serves the purpose of measuring the position of a user who wears it while walking, and it reports the displacement from a starting point that has been walked.

The preferred embodiment of Walking Sensor 1000 uses a set of sensors: an accelerometer 1001*a* and direction sensors such as gyro 1001*b* (angular rate sensor) and magnetic field sensor 1001*c* (compass). Together, these sensors are used to measure both direction and distance walked by the user. Optionally, gyro 1001*b* or magnetic field sensor 1001*c* could be omitted, but the possible data fusion, such as described above for Data fusion 304 would then not be possible. Preferably, accelerometer 1001*a*, gyro 1001*b*, and magnetic field sensor 1001*c* are 3-axis devices, so that any mounting configuration can be accommodated, although optionally, fewer axes could be used. Preferably, Tilt-angle compensation 1002 is included to use the accelerometer 1001*a* data to determine which direction is up and compensate for a non-vertical mounting of Walking Sensor 1000, and thus reference all rotations and accelerations to a true vertical reference axis. Based on the sensor data, Step direction detection 1003 looks at the recent net horizontal acceleration components and determines a horizontal direction that motions in the recent past have taken. Additionally, Step direction detection 1003 processes the net vertical accelerations in recent steps to determine if an upwards or downwards motion has taken place, such as a person using stairs, elevators, or escalators. In addition to identifying which direction in space a displacement occurred, Step direction detection 1003 also preferably categorizes the step relative to the user as a forward step, left-sideways step, right-sideways step, or back step, for example by looking for characteristic acceleration patterns indicative of each.

Figure 11:
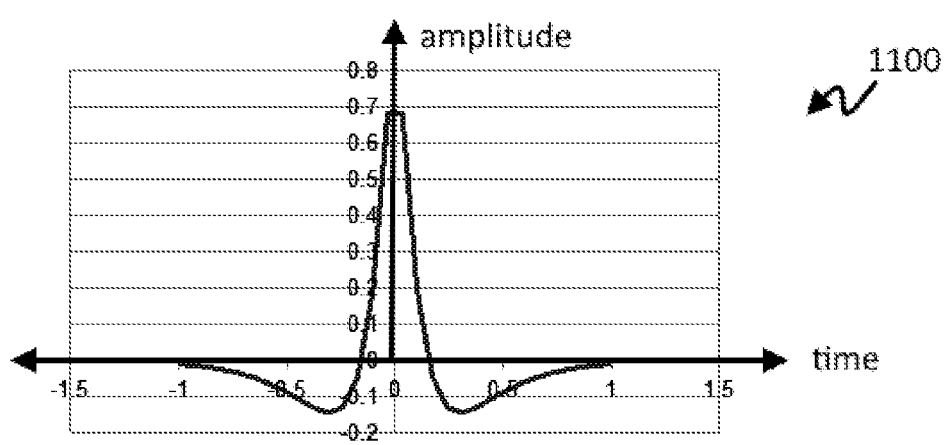
FIG. 11 shows an example ideal step waveform for use in a walking-distance sensor.

Walking Sensor 1000 performs a convolution of the acceleration data with an "ideal" step waveform 1004 for detecting steps and estimating step lengths. The convolution calculation, performed by Convolution 1005, helps to reduce noise in the acceleration waveform due to non-walking effects. FIG. 11 shows one possible example ideal step waveform 1100, which can be derived from examining and averaging large numbers of real-world walking waveforms. The ideal step waveform 1004, such as example ideal step waveform 1100 could be obtained over a large population of people, or customized for categories of people or for individuals. In the preferred embodiment, Example ideal waveform 1100 is adjusted to have a zero mean value, so that convolutions with it will not have a constant-offset bias, although optionally, this bias can be eliminated using other techniques known in the art. The ideal step waveform 1004 input to Convolution 1005 may be different for each acceleration axis (for example, forward, lateral, and vertical), as well as be different for different categories of stepping (for example, forward, left-sideways, right-sideways, and back).

In essence, in Convolution 1005, ideal step waveform 1004 is preferably scanned across a tilt-compensated acceleration waveform from Tilt-angle compensation 1002 or optionally across a multiple-axis combination of acceleration waveforms, and at each point in time (or optionally, at periodic or other selected points in time), a dot product of the acceleration time series and the ideal waveform series is performed over the interval in which they overlap. That dot product, or integration of point-by-point multiplications, is the output value from Convolution 1005 at that point. The resulting waveform of integrations can be used here as the convolution waveform.

Ideal step waveform 1004, if not created specifically for a user, can be stretched in the time axis to best match the characteristics of the user. For example, someone who takes very slow steps might need a more stretched-out Ideal step waveform 1004. The acceleration axes could potentially have different amounts of stretch, or even different waveform shapes. In a preferred embodiment, the front-to-back axis has a time duration of approximately 2× the other 2 axes.

Figure 12:
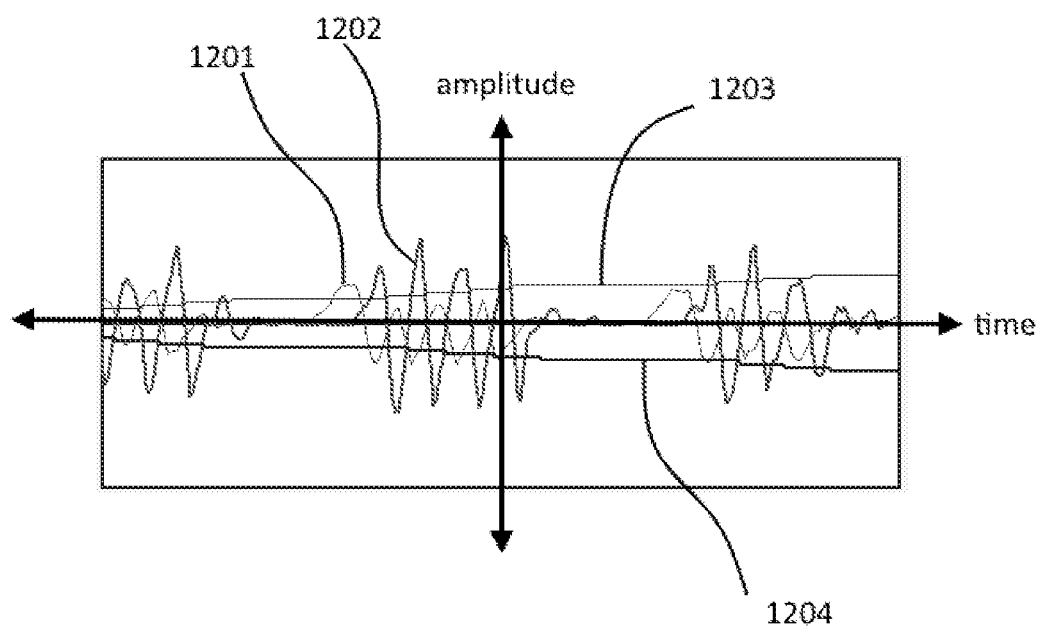
FIG. 12 shows an explanatory plot of an acceleration waveform and how it can be processed in an embodiment of the invention.

FIG. 12 shows an explanatory plot of an axis of acceleration waveform 1201 from Tilt-angle compensation 1002 and the resulting convolution waveform 1202 output by Convolution 1005, representing a total time of about 20 seconds. Upward-staircase plot 1203 is the accumulated count of steps from the positive-going excursions of the convolution waveform detected by Step framing 1006, whereas Downward-staircase plot 1204 is the negative of the accumulated count of steps from the negative-going excursions of the convolution waveform detected by Step framing 1006. In the preferred embodiment, Step framing 1006 computes the occurrence of a step is when the convolution waveform exceeds a threshold value. Optionally, a hysteresis, rather than a simple threshold value, could be added to avoid extraneous steps, per techniques known in the art.

Instead of the Convolution 1005, an embodiment of the invention could alternately replace Convolution 1005 with a block performing an operation such as a wavelet transform or other means known in the art to extract excursions of the waveform output by Tilt-angle compensation 1002. Alternately, outputs somewhat similar to that of Convolution 1005 could be provided by lowpass filtering to smooth out variabilities and by assuming the smoothed curves in the waveform correspond to the footsteps.

Feature vector extraction 1007 extracts various parameters, or features, about the convolution waveform output from Convolution 1005 over the time frame of a step detected by Step framing 1006. Example features that are extracted from the convolution waveform in the preferred embodiment for each axis, or for a combination of axes include:

($\alpha$) The maximum magnitude of the convolution waveform during the step.

($\beta$) The integral of the area under the curve of the convolution waveform.

($\chi$) The length in time of the convolution waveform being above a threshold value, Preferably, separate features can be made from the above parameters for the positive and negative excursions of the convolution waveform. Optionally, values made by combining convolution values from multiple axes, such as a weighted average or a magnitude function, could used as additional features.

Together, the set of features extracted for a step becomes a feature vector, which is the output of Feature vector extraction 1007. Per-feature step length estimator 1009 converts each value in the vector vector from Feature vector extraction 1007 into a step-length estimate by using Step-length models 1008. In the preferred embodiment, Step-length models 1008 contains linear models, such that each item in the feature vector is multiplied by an independent coefficient from Step-length models 1008, the product of which is added to a constant from Step-length models 1008. In an alternate embodiment, Step-length models contains non-linear functions to apply to each element of the feature vector from Feature vector extraction 1007.

The output of Per-feature step-length estimator is a vector of step length estimates, each corresponding to an element of the feature vector from Feature vector extraction 1007. Step length estimator 1010 combines the multiple step length estimates from Per-feature step length estimator 1009 into a single estimate of step length. In the preferred embodiment, a weighted average of the estimates from Per-feature step length estimator 1009 is computed to arrive at the final distance measurement. The weights in the weighted average are in inverse proportion to the variances of each of the parameters in predicting the known step lengths. This would more or less approximate the idea of a maximum-likelihood estimation from multiple data sources. Alternately, other schemes of weighting the estimates from Per-feature step length estimator 1009 could be used to arrive at the final step length estimate from Step length estimator 1010.

Step displacement estimate 1011 is the output of the processing within Walking Sensor 1000, and combines the step length with the step direction to produce a step displacement measurement.

Alternate embodiments of Walking Sensor 1000 could omit the modules used to determine direction and output only a step length, while still following the essential blocks shown in FIG. 10. Tilt-angle compensation 1002 could be omitted, using just the available axes from accelerometer 1001a, particularly if there is confidence the hardware will be mounted in a known orientation. One or two axes, instead of three, could be used by adjusting the number of inputs and outputs to the various blocks shown in FIG. 10.

Rather than using Per-feature step length estimator 1009 as described above, Step length estimator 1010 could combine multiple elements from the feature vector output of Feature vector extraction 1007. For example, Step length estimator 1010 could treat the feature vector as a single or multiple vector inputs to a system such as a linear estimator, a neural network, or other known technique for mapping feature vectors to an output values.

Yet another embodiment would accumulate the feature-vector values from Feature vector extraction 1007 over multiple steps to estimate total walking distance over multiple steps. Rather than a fixed number of steps, this accumulation could alternately proceed for a particular time period, say 5 seconds, or alternately, could be accumulated for an entire walk.

Obtaining Step-Length Models

Conversion coefficients, factors, or equations are needed to populate Step-length models 1008 with the numbers that can be used to convert the feature vectors from Feature vector extraction 1007 into distance estimates. Such conversion coefficients could be obtained from theoretical biomechanical model of walking, backing out how various types of walking would manifest in the values of these parameters.

In the preferred embodiment, the definition of coefficients for Step-length models 1008 is achieved by a calibration process. The preferred embodiment uses examples of actual step distances along with the corresponding features extracted by Feature vector extraction 1007. Various methods for obtaining the calibration data are possible, such as by having each user walk with the device over a test course of known length, or by using GPS signals to provide a known distance for a collection of steps. The average step length from the GPS data or the calibration course would be used along with the average feature vector values to create the calibration coefficients or equations. Calibrations could alternately be performed by one or more test subjects representing different user groups, and/or a correction factor could be applied for each user to correct systematic errors in the measurements produced by such standard models.

Figure 13:
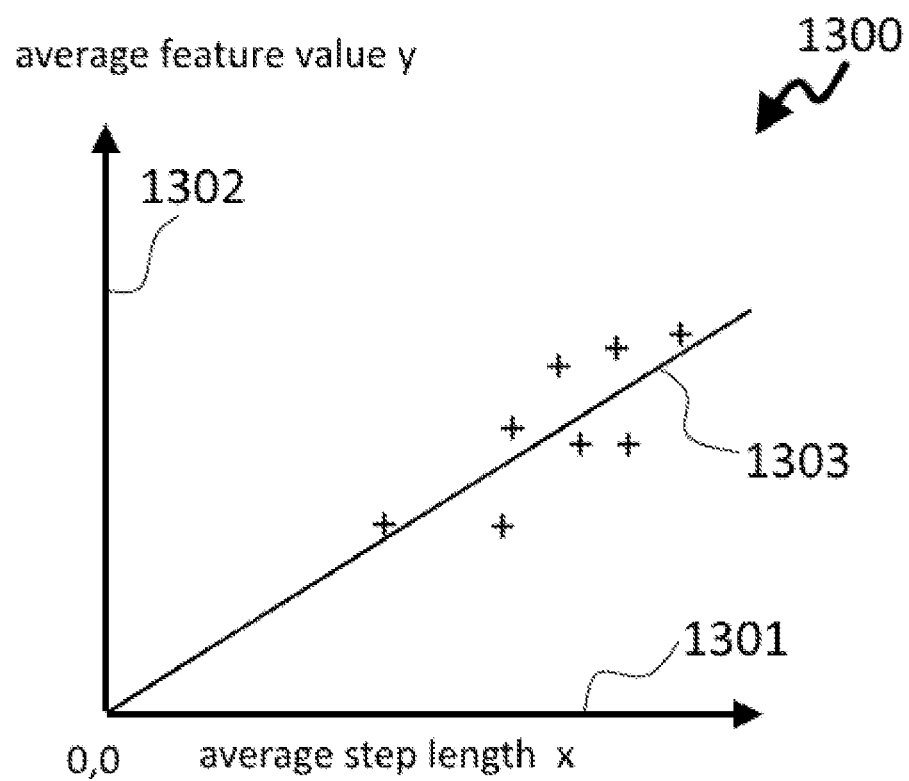
FIG. 13 is a graphical depiction of a calibration algorithm for a walking-distance sensor.

As an example, FIG. 13 is a graphical depiction of a preferred embodiment of Calibration Algorithm 1300 for a single feature output by Convolution 1005, plotted against average step length, over a series of, for example, 8 walks on a known calibration course, where the +'s in the graph area represent each of the walks. The average step length x axis 1301 represents the known average step length of the calibration course, whereas average feature value y axis 1302 is average feature value measured over the course. Straight-line 1303 is drawn by the calibration process. Calibration algorithm 1300 then computes the slope of straight line 1303 as the model coefficient for this element of the feature vector output by Convolution 1005. Other numbers of calibration walks could be used in alternate embodiments. In the preferred embodiment, Calibration Algorithm 1300 also measures the variance of the data points about straight line 1303 as input to weighting the estimates in Step length estimator 1010, such that the weight of each feature vector element is inversely monotonic with respect to the corresponding variance.

Optionally, if GPS or other external distance inputs are available, an embodiment of the present invention will continuously update the Step-length models with the external distance data using the above calibration techniques. One optional technique is to take the actual distance from the external sensor and perform a gradient-descent procedure on each of the elements of the parameter vector, i.e., to adjust the coefficients or weight of that parameter to make it predict a value closer to the actual value than it currently does. Another option would be to use the external distance measurement to define a simple correction factor by which to multiply the existing output of the walking sensor.

Walking Sensor 1000 could optionally be used without the rest of the present invention as described above, for other applications, such as for navigation by blind people using other output modalities than head pointing. Other types of pedometers or distance sensors could also be used with the remainder of the present invention. For example, a simple step-counter-based pedometer could be used instead of Walking Sensor 1000, but would provide different error characteristics.

Adjusting Walking Sensor Position Estimates

Since the output of Walking Sensor 1000 is the distance and direction of each step, the steps are added together (integrated) to estimate the current position of the user, so any errors in the Step displacement estimate 1011 will accumulate over time. Therefore, it may be helpful to use external features from the environment to correct and/or update the current position. Such external features could include RF emitters such as Wifi and Bluetooth, or places where the user turns while walking, suggestion corners in the environment, and places where the user moves up or down. If an electronic map of the environment is available, such features may be included in it, and techniques known in the art can be used to improve the position estimate.

However, if such maps are not available and no prior information is available about the actual locations of such features, the preferred embodiment of the present invention includes capabilities for using these features in a probabilistic method.

Figure 14:
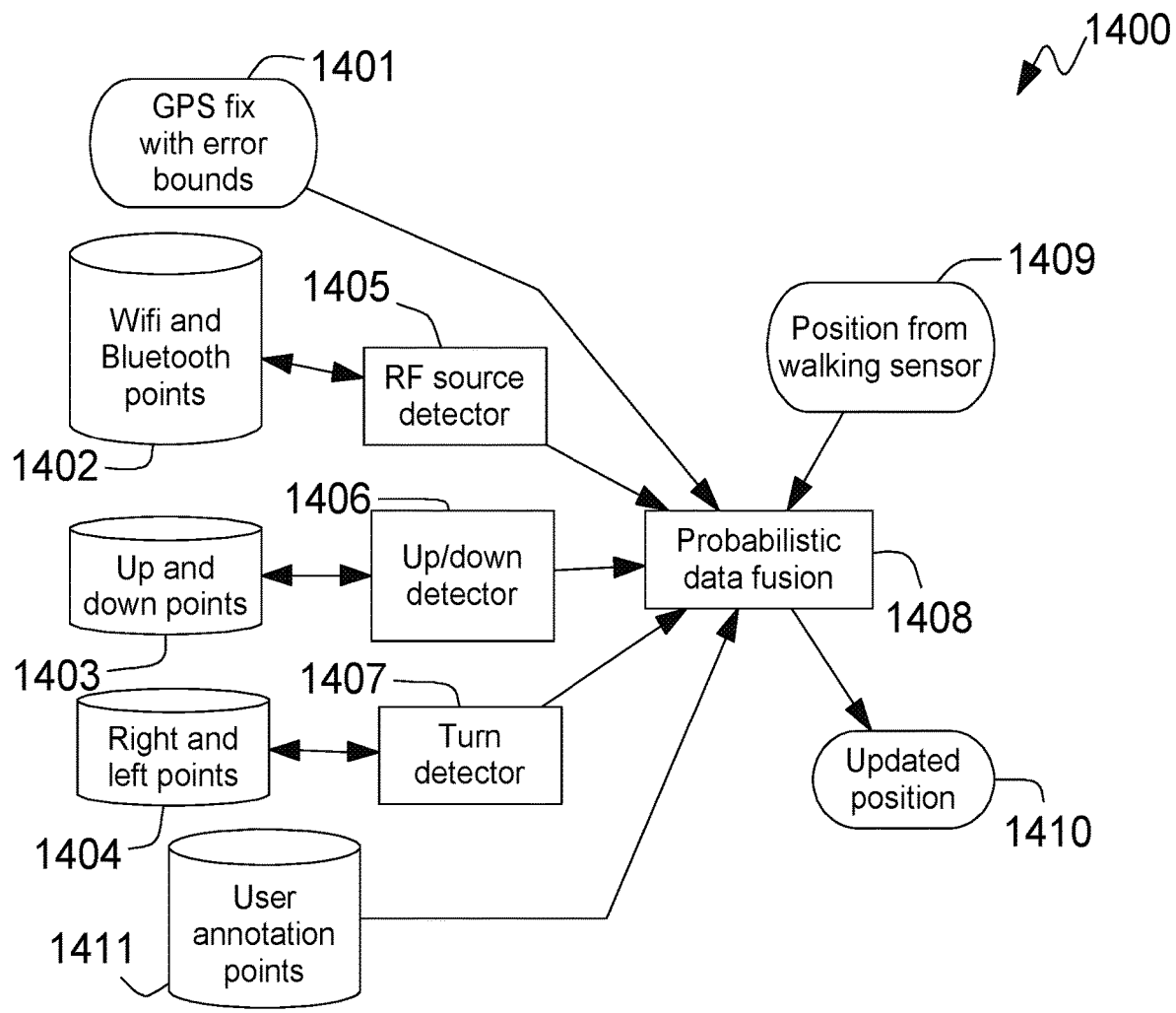
FIG. 14 depicts a walking position updater, which uses external features and data to update the position obtained from a walking sensor.

FIG. 14 depicts the preferred embodiment of Walking Position Updater 1400, which uses external features and data to update the position obtained from walking sensor location measurements, such as Walking Sensor 1000 estimates. GPS fix with error bounds 1401 may be the most obvious source of correction, and as GPS signals become available, are used for this purpose.

Other sources of correction include nearby radio emitters, such as WiFi hot spots and Bluetooth radios. RF source detector 1405 monitors for the presence of such sources, for example, using the radio features on a smart phone, and stores the source ID, signal strength, and current position in Wifi and Bluetooth points 1402. Based on multiple observations of a particular source ID as the user moves through the area, an estimate of the actual location of the RF source is calculated, assuming an approximate inverse-square relationship of signal strength with distance from the source. When later recalling a point from Wifi and Bluetooth points 1402, the implied position of the user is within a ring-shaped distribution around the calculated RF source that corresponds to the current detected signal strength, the width of the ring distribution determined by the assumed uncertainty due to imperfections in the inverse-square assumption and in the position uncertainty when each RF measurement was originally recorded.

Up/down detector 1406 detects when the user goes up or down, indicating for example, stairs, elevators, or escalators, by monitoring accelerometer signals, such as from accelerometers 218, for net vertical motion, and stores the location and direction of motion in Up and down points 1403. Turn detector 1407 detects when the user has taken a left or right turn, corresponding, for example, to corners in buildings or sidewalks, by monitoring for points where the recent walked path indicates such changes in direction, and stores the location and direction of turn in Right and left points 1404.

User annotation points 1411 additionally allows for storage of inputs from the user such as "doorway", "stairs", "fountain", and the location, so that if such annotations are repeated in the future, they can be potentially be used to refine the current position. In the preferred embodiment, these annotations are inserted by smartphone app 202 based on speech or touch input.

The position implied when recalling a turn from Right and left points 1404, a vertical motion from Up and down points 1403, or an annotation from User annotation points 1411 is the stored location where the point was recorded, within a circle-shaped distribution defined by the uncertainty in position as of when the point was recorded. In the preferred embodiment, this circularly-symmetric distribution is further weighted according to an assumed, for example, constant, likelihood that an additional, unknown feature of the same type is in fact closer to the user than the one being accessed from the respective point storage.

In the process of updating the Position from walking sensor 1409, RF source detector 1405 compares any currently-detected sources with sources that are stored in Wifi and Bluetooth points 1402 and reports both to Probabilistic data fusion 1408. Similarly, Up/down detector 1406 compares any current up/down points with stored points in Up and down points 1403 and reports both to Probabilistic data fusion 1408, and Turn detector 1407 reports current turns and nearby matches from Right and left points 1404 to Probabilistic data fusion 1408. Additionally, User annotation points 1411 reports matches in user annotations to Probabilistic data fusion 1408. Each source also reports the associated uncertainty distribution as described in the preceding paragraphs.

Probabilistic data fusion 1408 considers all currently-available points from the above detectors and utilizes probabilistic reasoning to update Position from walking sensor 1409 to output Updated position 1410. One embodiment of the present invention uses a weighted average of the Position from walking sensor 1409, the implied positions, if available, from RF source detector 1405, Up/down detector 1406, Turn detector 1407, and User annotation points 1411, where the weighting is inversely proportional to the variance of the position distribution of each of the implied position indications, using techniques known in the art. Alternate embodiments of the present invention could apply Kalman Filters, Bayesian Networks, or other known data fusion technique. A preferred embodiment of Probabilistic data fusion 1408 applies a communication-theory model in which each position source is considered a redundant signal channel with additive noise corresponding to the uncertainties introduced in the process of recording the point and in the inherent uncertainty in the original measurements. In this embodiment, an optimal signal-detection strategy is utilized to choose the highest-likelihood value of position from among the noisy signal channels.

Application to Other Devices that can be Aimed

Figure 15:
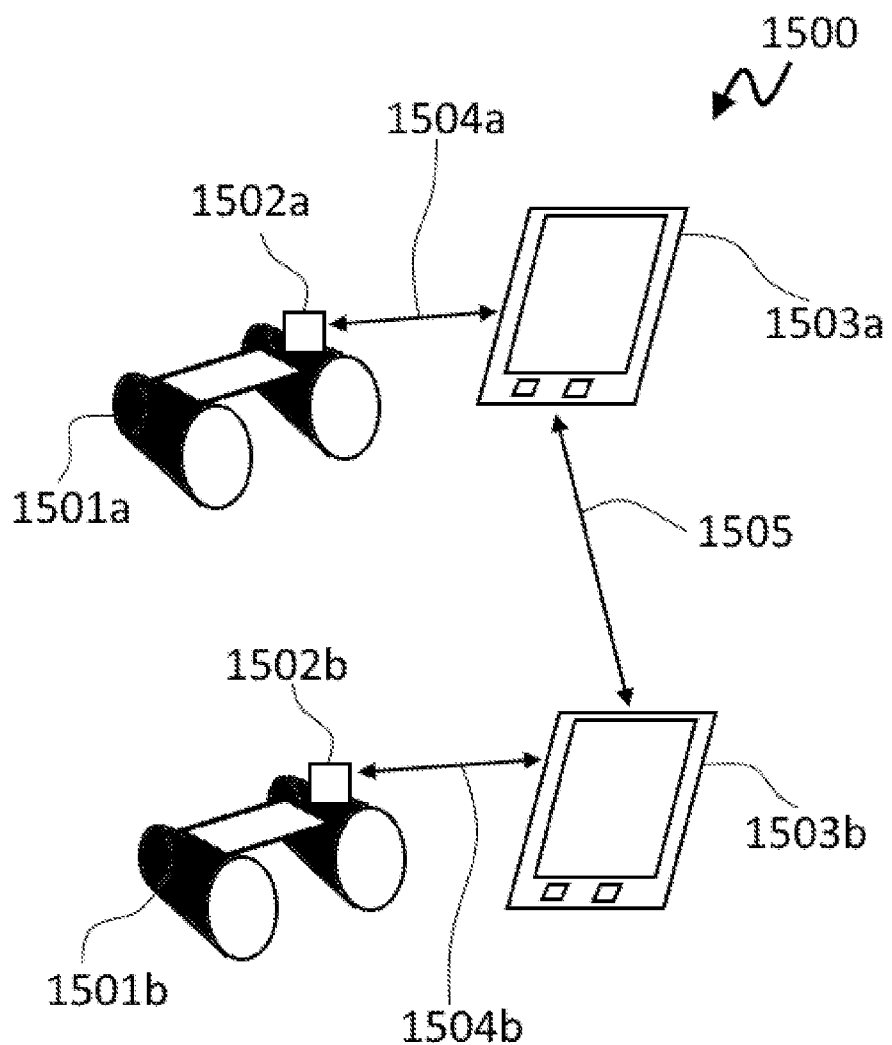
FIG. 15 depicts an embodiment of the present invention for two or more users of binoculars.

Another application category of the present invention is for coordinating the gaze angle among multiple users. The angle-updating approach described in FIG. 7 applies in this embodiment to multiple users, in addition to a single user. In this embodiment, Start point 702 corresponds to the current position of one user, and Current point 703 corresponds to the current position of another user. Analogous mathematics apply for updating the gaze angle of one user as a function of the gaze angle of another. For example, this embodiment applies to multiple users of binoculars, telescopes, cameras, or other optical/electronic devices that need to be pointed, or to simply looking at the same object. FIG. 15 depicts an embodiment of the present invention for two users, such as two bird watchers. Instead of mounting Head-worn hardware 201 to the users' heads, equivalent binoculars-mounted hardware 1502a and 1502b optionally are mounted to each pair of binoculars 1501a and 1501b. If one user spots an interesting bird, he/she presses a button on the first set of binoculars-mounted hardware 1502a to mark the direction. A wired or preferably wireless link to the other user communicates the updated gaze angle, computed per gaze-angle updating algorithm 700 of FIG. 7 to the second binoculars-mounted hardware 1502b. Then, the feedback on the others' device-mounted hardware guides the others to point their binoculars toward the bird of interest.

In the preferred embodiment of a Binoculars Gaze Synchronization System 1500 depicted in FIG. 14, the first binoculars-mounted hardware 1502a is linked by Bluetooth link 1504a to smart phone 1503a. The second user's binoculars-mounted hardware 1502b is linked by Bluetooth link 1504b to smart phone 1503b. Gaze angles are then transmitted between the two smartphones using Bluetooth, WiFi, or a cellular connection 1505, such as over the Internet. Alternately, both binoculars-mounted hardware 1502a and 1502b are linked to one smartphone or tablet via Bluetooth, and the transmission of gaze angles takes place via an app on that smartphone.

In yet another embodiment, the two binoculars-mounted hardware 1502a and 1502b are linked wirelessly to each other, and a mark on one is transmitted to the other for later recall. An alternate embodiment of the present invention supports the same idea to apply to more than two binocular users, by transmitting the gaze angle to multiple recipients. Regardless of the interfacing techniques, then for each user, the feedback cues attached to their binoculars directs them in how to point the binoculars to see the bird of interest, using the techniques described previously in this specification. For applications such as bird watching, the distances at which the observations are taking place may be limited to a particular range, and so more precise set membership functions than depicted in FIG. 6 would be defined, such as having the shortest distance represented in the fuzzy distance interval sets be 20 feet and the longest 2000 feet. Alternate embodiments for coordinating between multiple aimable devices using variations on the techniques described in example form above, are within the scope of the present invention and will be apparent to those with skill in the art.

Yet another embodiment controls a mechanically-aimed camera, binoculars, telescope, lighting system, or weapons system with the gaze angle provided by the present invention. Or to control a computer based on the gaze angles provided by the present invention. Another embodiment could be to use a different system for input of gaze angle, and the Gaze-director feedback-based system for output. For example, a video-based or reflective dot-based head tracker designed for computer control could be the input system, enabling an attachments-free sensor, rather than the head-worn device.

While there has been illustrated and described what is at present considered to be the preferred embodiment of the subject invention, it will be understood by those skilled in the art that various changes and modifications may be made and equivalents may be substituted for elements thereof without departing from the true scope of the invention.

The invention claimed is:

1. A system for estimating relative positioning of a target object with respect to a moving object comprising:
   a sensor electronics configured to output an angle sensor signal based on a direction of the target object relative to a first position of the moving object, further configured to output a position sensor signal based on a distance to a second position of the moving object relative to the first position of the moving object;
   a processing device comprising a memory device, wherein the memory device stores program data comprising:
   a first vector comprising information related to the direction of the target object with respect to the first position of the moving object,
   a second vector comprising information related to a difference of the second position of the moving object with respect to the first position of the moving object,
   a third vector comprising information related to a direction of the target object with respect to the second position of the moving object,
   and a likelihood function representation comprising a predetermined mapping between a plurality of distance categories and a plurality of distance ranges;
   wherein the memory device further stores a program code that when executed by the processing device, causes the processing device to:
   receive the angle sensor signal and to modify the first vector based on the angle sensor signal,
   receive the position sensor signal and to modify the second vector based on the position sensor signal,
   receive a distance-category signal corresponding to a category of the plurality of distance categories,
   generate a selected-distance signal corresponding to a point within a distance range of the plurality of distance ranges that is associated in the predetermined mapping with the category,
   generate an optimal-point signal based on a distance value corresponding to the selected-distance signal and further based on an angle value associated with the first vector,
   and modify the third vector on the basis of a trigonometric program code configured to receive the optimal-point signal and the second vector;
   whereby based on the distance category, the third vector can comprise information related to updated angles of the target object with respect to the moving object after motion of the moving object.

2. The system of claim 1, wherein the predetermined mapping comprises a mapping associated with a particular distance category, wherein the mapping associated with a particular distance category comprises a mapping of a plurality of distance values to a plurality of membership likelihood values,
   wherein a membership likelihood value of the plurality of membership likelihood values corresponds to a likelihood that an associated distance value of the plurality of distance values is a member of the particular distance category,
   and wherein the program code is configured to generate the selected-distance signal based on the associated distance value by determining that the associated distance value corresponds to a goal-criterion area under a set-membership-function curve, wherein the set-membership-function curve corresponds to the plurality of membership likelihood values.

3. The system of claim 2, wherein the mapping associated with a particular distance category comprises a fuzzy set representation.

4. The system of claim 1,
   wherein the sensor electronics comprises a sensor element, and wherein the sensor electronics is further configured to output the angle sensor signal based on an orientation of the sensor element at the first position of the moving object,
   whereby the angle sensor signal can be produced by pointing the sensor element relative to the target object.

5. The system of claim 4, wherein the sensor element is attached to an optical device comprising an eyeglass frame, a camera, a telescope, and/or a binoculars,
   whereby the angle sensor signal can be produced when viewing the target object with the optical device.

6. The system of claim 4, wherein the sensor element is attached to a wearable item,
   whereby the angle sensor signal can be produced when the wearable item is oriented with respect to the target object.

7. The system of claim 4, wherein the sensor element comprises a magnetometer and/or a gyro.

8. The system of claim 1, wherein the sensor electronics comprises a position sensor comprising a walking position sensor and/or a GPS receiver, and wherein the position sensor signal is produced based on an output of the position sensor.

9. The system of claim 1, wherein the processing device further comprises a user interface,
   and wherein the user interface comprises a user-interface input element,
   and wherein the user-interface input element is configured to receive an input corresponding to a selected category of the plurality of distance categories,
   and wherein the user interface is configured to output the distance-category signal on the basis of the selected category, whereby users of the system can specify the distance-category signal manually.

10. The system of claim 1, wherein the processing device further comprises a user interface, and wherein the program code is further configured to output display information to the user interface corresponding to the third vector, and the user interface is configured to receive the output display information and present the output display information in visual, vibration, speech, and/or audio format, whereby users of the system can be provided information about angles of the target object with respect to the moving object.

11. A system for estimating relative positioning of a target object with respect to a first object and a second object comprising:

a sensor electronics configured to output an angle sensor signal based on a direction of the target object relative to a position of the first object, further configured to output a position sensor signal based on a distance to a position of the second object relative to the position of the first object;

a processing device comprising a memory device, wherein the memory device stores program data comprising:

a first vector comprising information related to the direction of the target object with respect to the position of the first object, a second vector comprising information related to a difference of the position of the second object with respect to the position of the first object, a third vector comprising information related to a direction of the target object with respect to the position of the second object, and a likelihood function representation comprising a predetermined mapping between a plurality of distance categories and a plurality of distance ranges;

wherein the memory device further stores a program code that when executed by the processing device, causes the processing device to:

receive the angle sensor signal and to modify the first vector based on the angle sensor signal, receive the position sensor signal and to modify the second vector based on the position sensor signal, receive a distance-category signal corresponding to a category of the plurality of distance categories, generate a selected-distance signal corresponding to a point within a distance range of the plurality of distance ranges that is associated in the predetermined mapping with the category, generate an optimal-point signal based on a distance corresponding to the selected-distance signal and further based on an angle value associated with the first vector, and modify the third vector on the basis of a trigonometric program code configured to receive the optimal-point signal and the second vector;

whereby based on the distance category, the third vector can comprise information related to updated angles of the target object with respect to the second object when information is available about angles relative to the first object.

12. The system of claim 11, wherein the predetermined mapping comprises a mapping associated with a particular distance category, wherein the mapping associated with a particular distance category comprises a mapping of a plurality of distance values to a plurality of membership likelihood values, wherein a membership likelihood value of the plurality of membership likelihood values corresponds to a likelihood that an associated distance value of the plurality of distance values is a member of the particular distance category, and wherein the program code is configured to generate the selected-distance signal based on the associated distance value by determining that the associated distance value corresponds to a goal-criterion area under a set-membership-function curve, wherein the set-membership-function curve corresponds to the plurality of membership likelihood values.

13. The system of claim 12, wherein the mapping associated with a particular distance category comprises a fuzzy set representation.

14. The system of claim 11, wherein the sensor electronics comprises a sensor element, and wherein the sensor electronics is further configured to output the angle sensor signal based on an orientation of the sensor element at the position of the first object, whereby the angle sensor signal can be produced by pointing the sensor element relative to the target object.

15. The system of claim 14, wherein the sensor element is attached to an optical device comprising an eyeglass frame, a camera, a telescope, and/or a binoculars, whereby the angle sensor signal can be produced when viewing the target object with the optical device.

16. The system of claim 14, wherein the sensor element is attached to a wearable item, whereby the angle sensor signal can be produced when the wearable item is oriented with respect to the target object.

17. The system of claim 14, wherein the sensor element comprises a magnetometer and/or a gyro.

18. The system of claim 11, wherein the sensor electronics comprises a position sensor comprising a walking position sensor and/or a GPS receiver, and wherein the position sensor signal is produced based on an output of the position sensor.

19. The system of claim 11, wherein the processing device further comprises a user interface, and wherein the user interface comprises a user-interface input element, and wherein the user-interface input element is configured to receive an input corresponding to a selected category of the plurality of distance categories, and wherein the user interface is configured to output the distance-category signal on the basis of the selected category, whereby users of the system can specify the distance-category signal manually.

20. The system of claim 11, wherein the processing device further comprises a user interface, and wherein the program code is further configured to output display information to the user interface corresponding to the third vector, and the user interface is configured to receive the output display information and present the output display information in visual, vibration, speech, and/or audio format, whereby users of the system can be provided information about angles of the target object with respect to the second object.

* * * * *